US 9,733,453 B2

(12) United States Patent
Tsai et al.

(10) Patent No.: US 9,733,453 B2
(45) Date of Patent: Aug. 15, 2017

(54) IMAGING OPTICAL SYSTEM, IMAGE CAPTURING DEVICE, AND ELECTRONIC DEVICE

(71) Applicant: LARGAN PRECISION CO., LTD., Taichung (TW)

(72) Inventors: Tsung-Han Tsai, Taichung (TW); Hsin-Hsuan Huang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 124 days.

(21) Appl. No.: 14/518,446

(22) Filed: Oct. 20, 2014

(65) Prior Publication Data

US 2016/0033744 A1 Feb. 4, 2016

(30) Foreign Application Priority Data

Jul. 30, 2014 (TW) .............................. 103125977 A

(51) Int. Cl.
*G02B 13/00* (2006.01)
(52) U.S. Cl.
CPC ................................. *G02B 13/0045* (2013.01)
(58) Field of Classification Search
None
See application file for complete search history.

(56) References Cited

U.S. PATENT DOCUMENTS

2013/0314804 A1* 11/2013 Kubota .............. G02B 13/0015
359/757
2015/0138431 A1  5/2015 Shin et al.
2015/0323765 A1 11/2015 Hashimoto
2015/0362703 A1 12/2015 Park
2016/0004039 A1  1/2016 Chen

FOREIGN PATENT DOCUMENTS

| JP | 2012220741 A | 11/2012 |
| JP | 2013/242449 | 12/2013 |
| JP | 2014010399 A | 1/2014 |
| JP | 2014010400 A | 1/2014 |
| JP | 2014010401 A | 1/2014 |
| TW | 201418763 A | 5/2014 |

* cited by examiner

*Primary Examiner* — Scott J Sugarman
*Assistant Examiner* — Gary O'Neill
(74) *Attorney, Agent, or Firm* — Locke Lord LLP; Tim Tingkang Xia, Esq.

(57) ABSTRACT

An imaging optical system includes, in order from an object side to an image side, a first lens element, a second lens element, a third lens element, a fourth lens element, a fifth lens element and a sixth lens element. The first lens element has positive refractive power in a paraxial region thereof. The second lens element has negative refractive power in a paraxial region thereof. Both of the third and fourth lens elements have refractive power. The fifth lens element with refractive power has an object-side surface being concave in a paraxial region thereof and an image-side surface being convex in a paraxial region thereof. The sixth lens element with positive refractive power has an object-side surface being convex in a paraxial region thereof and an image-side surface being concave in a paraxial region thereof. The imaging optical system has a total of six lens elements with refractive power.

25 Claims, 22 Drawing Sheets

IMAGING OPTICAL SYSTEM, IMAGE CAPTURING DEVICE, AND ELECTRONIC DEVICE

RELATED APPLICATIONS

This application claims priority to Taiwan Application Serial Number 103125977, filed Jul. 30, 2014, which is incorporated by reference herein in its entirety.

BACKGROUND

Technical Field

The present disclosure relates to an imaging optical system. More particularly, the present disclosure relates to a compact imaging optical system applicable to an electronic device.

Description of Related Art

As personal electronic products nowadays has been becoming more and more compact, the internal components of the electronic products are also required to be smaller in size than before. Except for the demand of miniaturization, the advanced semiconductor manufacturing technologies making the pixel size of sensors to be reduced have also urged compact optical systems to evolve toward the field of higher megapixels. In addition, the popularity of smart phones and tablet personal computers also significantly increases the requirements for high resolution and image quality of present compact optical systems. Therefore, there is also an increasing demand for compact optical systems featuring better image quality.

The conventional optical systems usually adopt more lens elements (ex. an optical system with six lens elements) to fulfill the demand of higher image quality. However, adopting more lens elements inevitably increases the difficulty in reducing the total track length thereof. Therefore, it is not favorable for the current market trends of being compact. It is critical to make a balance between obtaining high image quality and keeping a compact size. Furthermore, the sensitivity of the system is also an important factor in the modern optical systems, since excessively high sensitivity will result in difficulty in manufacturing and is not favorable for mass production.

To sum up, there is a need for an imaging optical system satisfying the demand of compactness and is able to provide high image quality and suitable sensitivity.

SUMMARY

According to one aspect of the present disclosure, an imaging optical system including, in order from an object side to an image side: a first lens element having positive refractive power in a paraxial region thereof; a second lens element having negative refractive power in a paraxial region thereof; a third lens element having refractive power; a fourth lens element having refractive power; a fifth lens element with refractive power having an object-side surface being concave in a paraxial region thereof and an image-side surface being convex in a paraxial region thereof; wherein both of the object-side surface and the image-side surface of the fifth lens element are aspheric; and a sixth lens element with positive refractive power in a paraxial region thereof having an object-side surface being convex in a paraxial region thereof and an image-side surface being concave in a paraxial region thereof; wherein both of the object-side surface and the image-side surface of the sixth lens element are aspheric, and the image-side surface of the sixth lens element has at least one inflection point; wherein the imaging optical system has a total of six lens elements with refractive power; wherein a focal length of the imaging optical system is f, a curvature radius of the image-side surface of the fourth lens element is R8, an axial distance between the fourth lens element and the fifth lens element is T45, a central thickness of the fifth lens element is CT5, and the following conditions are satisfied:

$-0.50 < f/R8$; and $0.30 < T45/CT5$.

According to another aspect of the present disclosure, an imaging optical system including, in order from an object side to an image side: a first lens element having positive refractive power in a paraxial region thereof; a second lens element having refractive power; a third lens element having refractive power; wherein both of an object-side surface and an image-side surface of the third lens element are aspheric; a fourth lens element having refractive power; wherein both of an object-side surface and an image-side surface of the fourth lens element are aspheric; a fifth lens element with refractive power having an object-side surface being concave in a paraxial region thereof and an image-side surface being convex in a paraxial region thereof; wherein both of the object-side surface and the image-side surface of the fifth lens element are aspheric; and a sixth lens element with positive refractive power in a paraxial region thereof having an object-side surface being convex in a paraxial region thereof and an image-side surface being concave in a paraxial region thereof; wherein both of the object-side surface and the image-side surface of the sixth lens element are aspheric, and the image-side surface of the sixth lens element has at least one inflection point; wherein the imaging optical system has a total of six lens elements with refractive power; wherein a focal length of the imaging optical system is f, a curvature radius of the image-side surface of the fourth lens element is R8, and the following condition is satisfied:

$-0.20 < f/R8$.

According to yet another aspect of the present disclosure, an image capturing device includes the imaging optical system according to the aforementioned aspect; and an image sensor; wherein the image sensor is positioned on or near an image surface of the imaging optical system.

According to still yet another aspect of the present disclosure, an electronic device includes the image capturing device according to the aforementioned aspect.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1A:
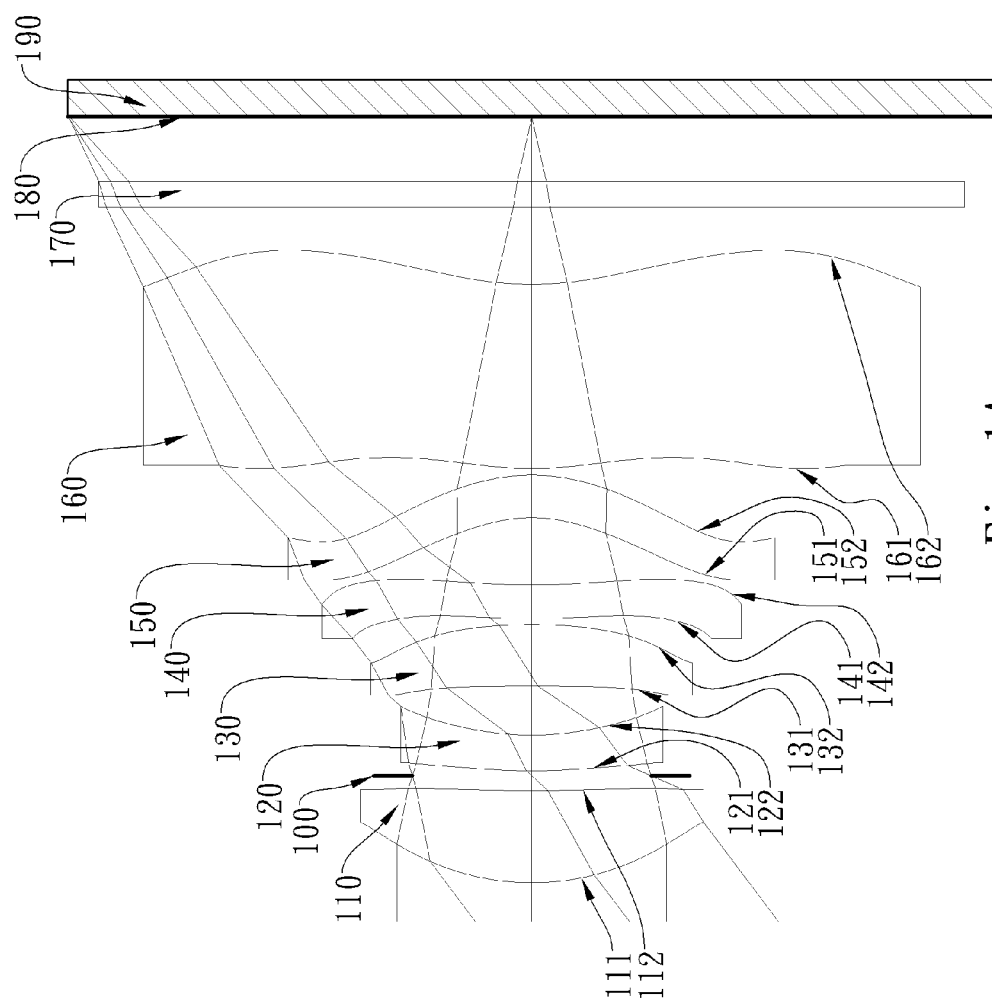
FIG. 1A is a schematic view of an image capturing device according to the 1st embodiment of the present disclosure.

An imaging optical system includes, in order from an object side to an image side, a first lens element, a second lens element, a third lens element, a fourth lens element, a fifth lens element, and a sixth lens element. The imaging optical system has a total of six lens elements with refractive power.

In the aforesaid imaging optical system, every two lens elements of the first lens element, the second lens element, the third lens element, the fourth lens element, the fifth lens element, and the sixth lens element have at least one air gap in between. Each of the first through sixth lens elements is a single and non-cemented lens element. That is, any two lens elements adjacent to each other are not cemented, and there is a space between the two lens elements. Moreover, the manufacturing process of the cemented lenses is more complex than the non-cemented lenses. In particular, a second surface of one lens element and a first surface of the following lens element need to have accurate curvature to ensure these two lens elements will be highly cemented. However, during the cementing process, those two lens elements might not be highly cemented due to displacement and it is thereby not favorable for the image quality of the imaging optical system. Therefore, the imaging optical system of the present disclosure provides six non-cemented lens elements for improving the problem generated by the cemented lens elements.

The first lens element has positive refractive power, so that it provides the imaging optical system with the positive refractive power as it needs to be so as to reduce the total track length of the imaging optical system. The first lens element has an image-side surface being concave in a paraxial region thereof, so that it is favorable for correcting the astigmatism of the imaging optical system.

The second lens element can have negative refractive power, so that it is favorable for correcting the aberration created by the first lens element. The second lens element may have an object-side surface being convex in a paraxial region thereof and an image-side surface being concave in a paraxial region thereof so that the astigmatism of the system can be effectively corrected and the image quality can be improved.

The third lens element may have positive refractive power in a paraxial region, which is favorable for distributing the refractive power of the first lens element and is favorable for reducing the sensitivity of the system. The third lens element may have an image-side surface being convex in a paraxial region, so that it is favorable for correcting the astigmatism and high order aberration as well as distributing the refractive power of the first lens element.

The fourth lens element may have negative refractive power in a paraxial region thereof and an object-side surface being convex in a paraxial region thereof, so that the curvature of the fourth lens element can be prevented from excessively strong and the spherical aberration can be reduced. At least one of the object-side and image-side surfaces of the fourth lens element has at least one inflection point, which is favorable for correcting off-axis aberration.

The fifth lens element may have negative refractive power in a paraxial region thereof, an object-side surface being concave in a paraxial region thereof, and an image-side surface being convex in a paraxial region thereof, which is favorable for correcting the aberration and chromatic aberration of the system.

The sixth lens element has positive refractive power in a paraxial region thereof, which is effectively for the distribution of the refractive power of the system so that the sensitivity of the system can be reduced and the manufacturing yield rate can be improved. The sixth lens element may have an object-side surface being convex in a paraxial region thereof and an image-side surface being concave in a paraxial region thereof so that the astigmatism can be favorably corrected. The image-side surface of the sixth lens element has at least one inflection point, which is favorable for shortening the back focal length of the system to keep the imaging optical system compact.

In the aforesaid imaging optical system, among the object-side surfaces and the image-side surfaces of the first through the sixth lens elements, at least five surfaces has at least one inflection point on each surface. Therefore, it is favorable for keeping the imaging optical system compact and reducing the peripheral aberration so as to improve the resolving power.

When a focal length of the imaging optical system is f, a curvature radius of the image-side surface of the fourth lens element is R8, and the following condition is satisfied: $-0.50<f/R8$, it is favorable for moderating the converging ability of the fourth lens element. Therefore, the curvature of the image-side surface of the fourth lens element can be prevented from excessively strong and thereby the spherical aberration can be reduced. It is thereby favorable for improving the resolving power of the imaging optical system. Preferably, the following condition is satisfied: −0.20<f/R8. More preferably, the following condition is satisfied: 0.0<f/R8.

When an axial distance between the fourth lens element and the fifth lens element is T45, a central thickness of the fifth lens element is CT5, and the following condition is satisfied: 0.30<T45/CT5. The sensitivity of the imaging optical system is more suitable, which is favorable for improving the manufacturing yield rate.

When a curvature radius of the object-side surface of the fifth lens element is R9, a curvature radius of the image-side surface of the fifth lens element is R10, and the following condition is satisfied: (R9+R10)/(R9−R10)<2.0. Therefore, the shape of the fifth lens element is favorable for correcting the astigmatism and aberration of imaging optical the system. Preferable, the following condition is satisfied: (R9+R10)/(R9−R10)<−3.0.

When the imaging optical system further includes an aperture stop, an axial distance between the aperture stop and the image-side surface of the sixth lens element is SD, an axial distance between the object-side surface of the first lens element and the image-side surface of the sixth lens element is TD, and the following condition is satisfied: 0.75<SD/TD<1.1. Therefore, it is favorable to obtain a balance between telecentricity and wide field of view.

When an f-number of the imaging optical system is Fno, and the following condition is satisfied: 1.50<Fno<2.50. Therefore, it is favorable for large aperture and improving the illumination in a peripheral region of the imaging optical system.

When a central thickness of the third lens element is CT3, a central thickness of the second lens element is CT2, the following condition is satisfied: 1.40<CT3/CT2. Therefore, the thicknesses of the second lens element and the third lens element will be favorable for avoiding the lens element from being deformed during manufacturing process so as to improve the manufacturing yield rate.

When the focal length of the imaging optical system is f, a focal length of the third lens element is f3, a focal length of the fourth lens element is f4, and the following condition is satisfied: 0.1<(f/f3)+(f/f4). Therefore, the refractive power of the third lens element and the fourth lens element is configured to favorably reduce the spherical aberration and the resolving power of the imaging optical system is thereby improved.

When an axial distance between the object-side surface of the first lens element and an image surface is TL, a maximal image height of the imaging optical system is ImgH, and the following condition is satisfied: TL/ImgH<1.80. Therefore, it is favorable for keeping the system compact to be applied to portable electronic devices.

When half of the maximal field of view of the imaging optical system is HFOV, and the following condition is satisfied: 38.0 degrees<HFOV. Therefore, it is favorable for the imaging optical system to obtain a wide field of view.

When the focal length of the imaging optical system is f, a focal length of the third lens element is f3, a focal length of the fourth lens element is f4, a focal length of the fifth lens element is f5, a focal length of the sixth lens element is f6, and the following condition is satisfied: 0.6<|f/f3|+|f/f4|+|f/f5|+|f/f6|<1.7. Therefore, the configuration of the refractive powers of the imaging optical system is more balanced, so that the sensitivity of the system can thus be favorably reduced.

When a focal length of the imaging optical system is f, a curvature radius of the image-side surface of the fifth lens element is R10, and the following condition is satisfied: f/R10<−1.5. Therefore, it is favorable for improving the resolving power of the imaging optical system.

When a vertical distance between a non-axial critical point on the object-side surface of the sixth lens element and an optical axis is Yc61, a vertical distance between a non-axial critical point on the image-side surface of the sixth lens element and an optical axis is Yc62, and the following condition is satisfied: 0.2<Yc61/Yc62<0.9. Therefore, it is favorable for reducing the incident angle of the light projecting onto an image sensor so as to correct the aberration of the off-axis.

According to the imaging optical system of the present disclosure, the lens elements thereof can be made of glass or plastic material. When the lens elements are made of glass material, the distribution of the refractive power of the imaging optical system may be more flexible to design. When the lens elements are made of plastic material, the manufacturing cost can be effectively reduced. Furthermore, surfaces of each lens element can be arranged to be aspheric (ASP), since the aspheric surface of the lens element is easy to form a shape other than spherical surfaces so as to have more controllable variables for eliminating the aberration thereof, and to further decrease the required number of the lens elements. Therefore, the total track length of the imaging optical system can also be reduced.

According to the imaging optical system of the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, when the lens element has a convex surface, it indicates that the surface is convex in the paraxial region thereof; when the lens element has a concave surface, it indicates that the surface is concave in the paraxial region thereof. Likewise, when the region of refractive power or focus of a lens element is not defined, it indicates that the region of refractive power or focus of the lens element is in the paraxial region thereof.

According to the imaging optical system of the present disclosure, an image surface of the imaging optical system, based on the corresponding image sensor, can be flat or curved, especially a curved surface being concave facing towards the object side of the optical imaging system.

According to the imaging optical system of the present disclosure, the imaging optical system can include at least one stop, such as an aperture stop, a glare stop or a field stop. Said glare stop or said field stop is for eliminating the stray light and thereby improving the image resolution thereof.

According to the imaging optical system of the present disclosure, an aperture stop can be configured as a front stop or a middle stop. A front stop disposed between an imaged object and the first lens element can provide a longer distance between an exit pupil of the imaging optical system and the image surface and thereby improves the image-sensing efficiency of an image sensor. A middle stop disposed between the first lens element and the image surface is favorable for enlarging the field of view of the imaging optical system and thereby provides a wider field of view for the same.

Figure 10:
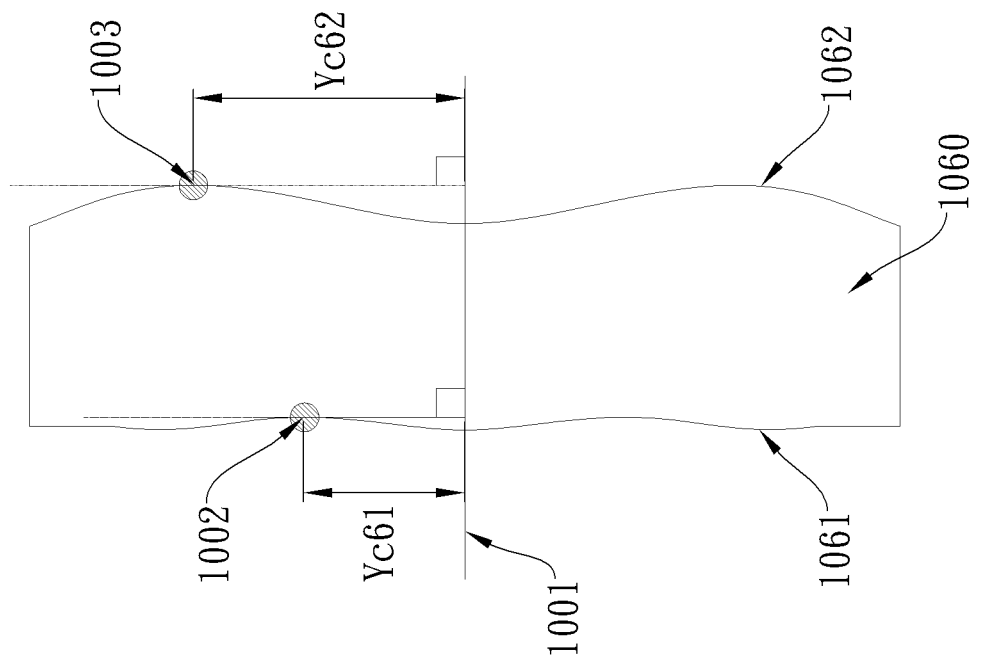
FIG. 10 shows Yc61 and Yc62 of the present disclosure.

Please refer to the FIG. 10 of the present disclosure, which shows the distance defined as Yc61 and Yc62 of the present disclosure. As shown in the embodiment of FIG. 10, when a vertical distance between a non-axial critical point 1002 on the object-side surface 1061 of the sixth lens element 1060 and an optical axis 1001 is Yc61; when a vertical distance between a non-axial critical point 1003 on the image-side surface 1062 of the sixth lens element 1060 and an optical axis 1001 is Yc62. Said critical point is a non-axial point of the lens surface where its tangent is perpendicular to the optical axis.

The present imaging optical system can be optionally applied to moving focus optical systems. According to the imaging optical system of the present disclosure, the imaging optical system is featured with good correction ability and high image quality, and can be applied to 3D (three-dimensional) image capturing applications, in products such as digital cameras, mobile devices, digital tablets, smart TV, wireless monitoring device, motion sensing input device, driving recording system, rear view camera system, wearable devices and other electronic devices.

According to the present disclosure, an image capturing device is provided. The image capturing device includes the imaging optical system according to the aforementioned imaging optical system of the present disclosure, and an image sensor, wherein the image sensor is disposed on or near an image surface of the aforementioned imaging optical system. As a result, it is favorable for improving the resolving power and illumination so as to achieve the best image quality. Preferably, the image capturing device can further include a barrel member, a holding member or a combination thereof.

Figure 11A:
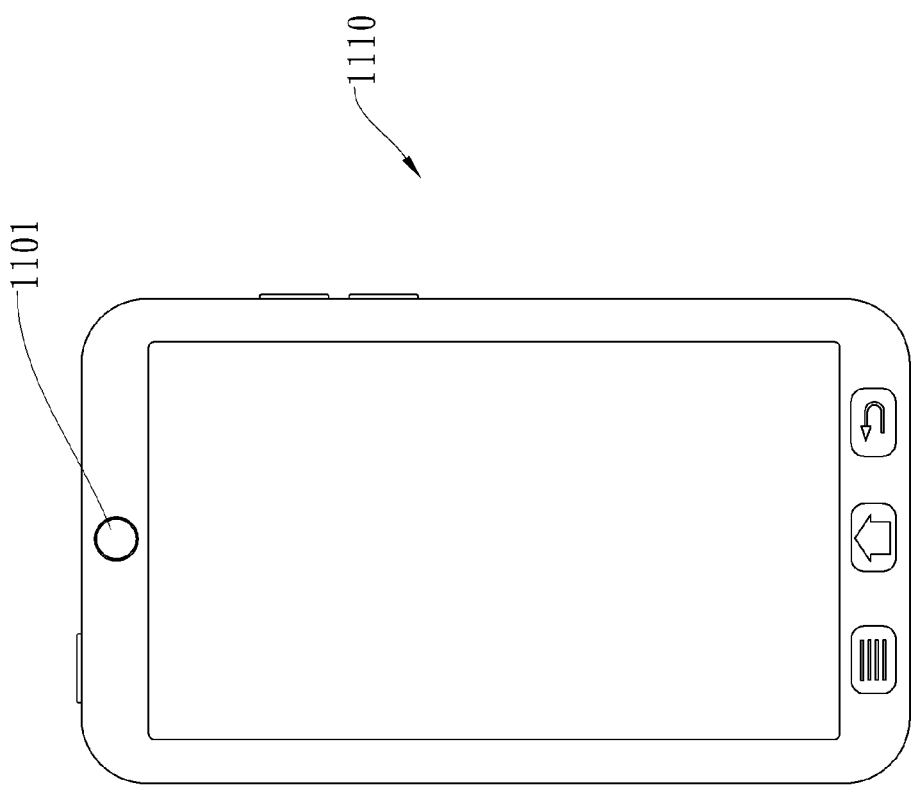
FIG. 11A shows a smart phone with an image capturing device of the present disclosure installed therein.
Figure 11B:
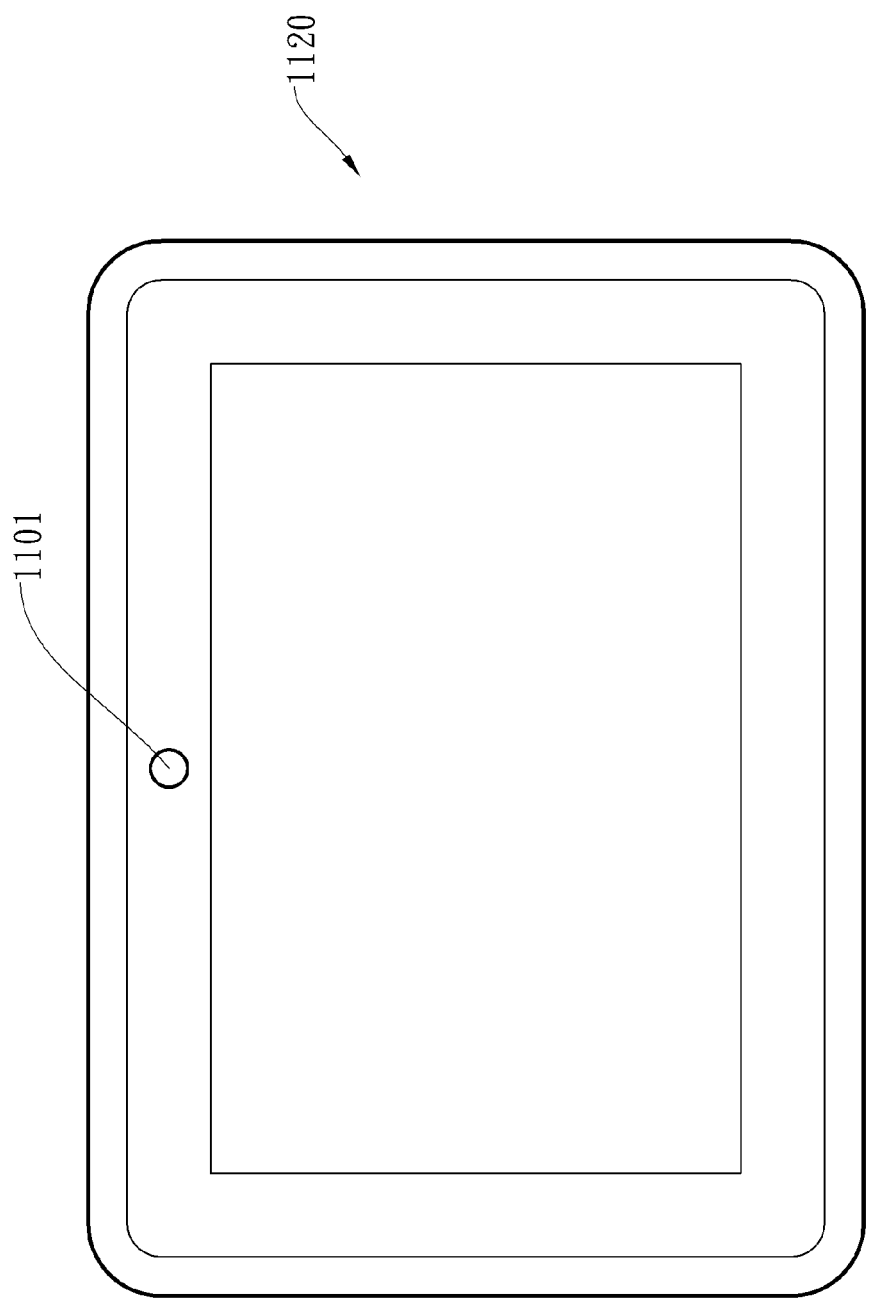
FIG. 11B shows a tablet personal computer with an image capturing device of the present disclosure installed therein.
Figure 11C:
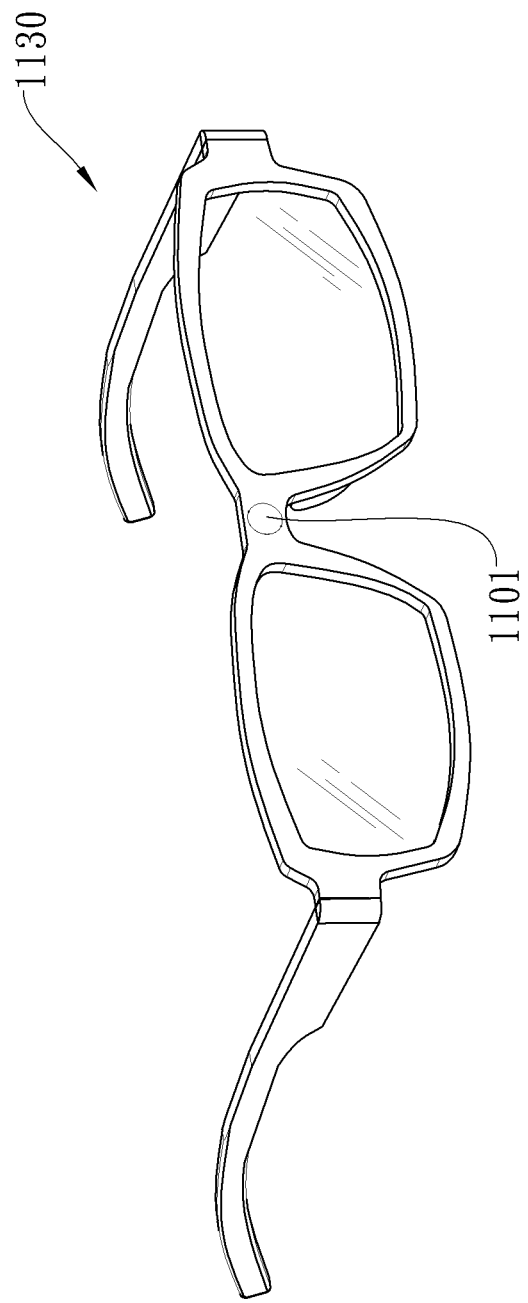
FIG. 11C shows a wearable device with an image capturing device of the present disclosure installed therein.

In FIG. 11A, FIG. 11B and FIG. 11C, an image capturing device 1101 may be installed in but not limited to an electronic device, including a smart phone 1110, a tablet personal computer 1120 or a wearable device 1130. The three exemplary figures of different kinds of electronic device are only exemplary for showing the image capturing device of present disclosure installing in an electronic device and is not limited thereto. Preferably, the electronic device can further include but not limited to display, control unit, random access memory unit (RAM) a read only memory unit (ROM) or a combination thereof.

According to the above description of the present disclosure, the following 1st-9th specific embodiments are provided for further explanation.

1st Embodiment

Figure 1B:
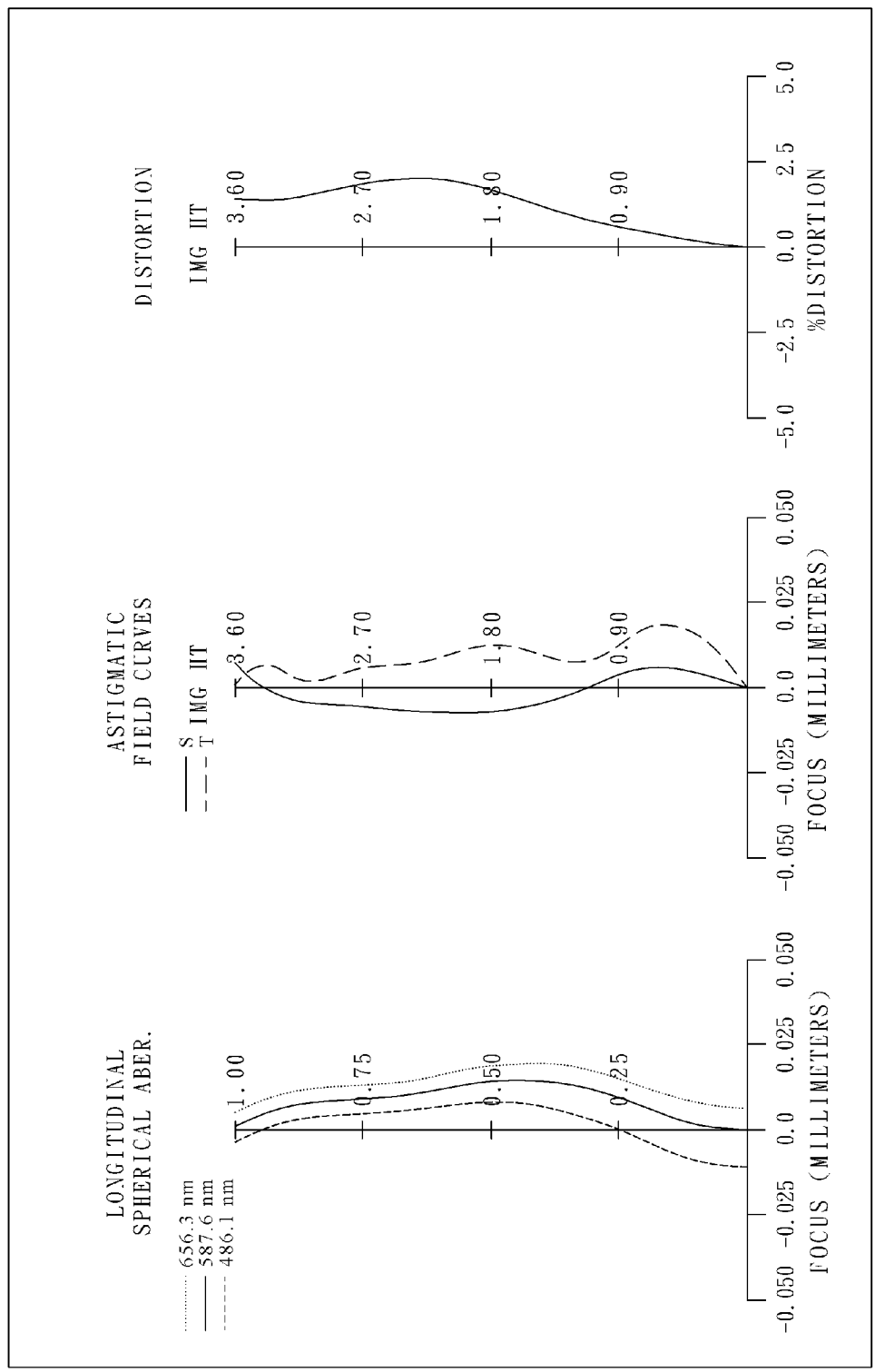
FIG. 1B shows spherical aberration curves, astigmatic field curves and a distortion curve of the image capturing device according to the 1st embodiment.

FIG. 1A is a schematic view of an image capturing device according to the 1st embodiment of the present disclosure. FIG. 1B shows, in order from left to right, spherical aberration curves, astigmatic field curves and a distortion curve of the image capturing device according to the 1st embodiment.

In FIG. 1A, the image capturing device includes the imaging optical system (not otherwise herein labeled) of the present disclosure and an image sensor 190. The imaging optical system includes, in order from an object side to an image side, a first lens element 110, an aperture stop 100, a second lens element 120, a third lens element 130, a fourth lens element 140, a fifth lens element 150, a sixth lens element 160, an IR-cut filter 170 and an image surface 180, wherein the imaging optical system has a total of six lens elements (110-160) with refractive power, which are non-cemented lens element.

The first lens element 110 with positive refractive power in a paraxial region thereof has an object-side surface being convex 111 in a paraxial region thereof and an image-side surface being concave 112 in a paraxial region thereof, which are both aspheric, the first lens element 110 is made of plastic material, and both of the object-side surface 111 and the image-side surface 112 of the first lens element 110 have at least one inflection point.

The second lens element 120 with negative refractive power in a paraxial region thereof has an object-side surface being convex 121 in a paraxial region thereof and an image-side surface being concave 122 in a paraxial region thereof, which are both aspheric, and the second lens element 120 is made of plastic material.

The third lens element 130 with positive refractive power in a paraxial region thereof has an object-side surface being concave 131 in a paraxial region thereof and an image-side surface being convex 132 in a paraxial region thereof, which are both aspheric, the third lens element 130 is made of plastic material, and both of the object-side surface 131 and the image-side surface 132 of the third lens element 130 have at least one inflection point.

The fourth lens element 140 with negative refractive power in a paraxial region thereof has an object-side surface being convex 141 in a paraxial region thereof and an image-side surface being concave 142 in a paraxial region thereof, which are both aspheric, the fourth lens element 140 is made of plastic material, and both of the object-side surface 141 and the image-side surface 142 of the fourth lens element 140 have at least one inflection point.

The fifth lens element 150 with negative refractive power in a paraxial region thereof has an object-side surface being concave 151 in a paraxial region thereof and an image-side surface being convex 152 in a paraxial region thereof, which are both aspheric, the fifth lens element 150 is made of plastic material, and both of the object-side surface 151 and the image-side surface 152 of the fifth lens element 150 have at least one inflection point.

The sixth lens element 160 with positive refractive power in a paraxial region thereof has an object-side surface being convex 161 in a paraxial region thereof and an image-side surface being concave 162 in a paraxial region thereof, which are both aspheric, the sixth lens element 160 is made of plastic material, and both of the object-side surface 161 and the image-side surface 162 of the sixth lens element 160 have at least one inflection point.

The IR-cut filter 170 is made of glass and located between the sixth lens element 160 and the image surface 180, and will not affect the focal length of the imaging optical system. The image sensor 190 is disposed on or near the image surface 180 of the imaging optical system.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

where,

X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient.

In the imaging optical system of the image capturing device according to the 1st embodiment, when a focal length of the imaging optical system is f, an f-number of the imaging optical system is Fno, and half of a maximal field of view of the imaging optical system is HFOV, these parameters have the following values: f=4.71 mm; Fno=2.25; and HFOV=37.0 degrees.

In the imaging optical system of the image capturing device according to the 1st embodiment, when a central thickness of the third lens element 130 is CT3, a central thickness of the second lens element 120 is CT2, the following condition is satisfied: CT3/CT2=1.73.

In the imaging optical system of the image capturing device according to the 1st embodiment, when an axial distance between the fourth lens element 140 and the fifth lens element 150 is T45, a central thickness of the fifth lens element 150 is CT5, the following condition is satisfied: T45/CT5=1.58.

In the imaging optical system of the image capturing device according to the 1st embodiment, when a focal length of the imaging optical system is f, a curvature radius of the image-side surface 142 of the fourth lens element 140 is R8, the following condition is satisfied: f/R8=0.86.

In the imaging optical system of the image capturing device according to the 1st embodiment, when a focal length of the imaging optical system is f, a curvature radius of the image-side surface 152 of the fifth lens element 150 is R10, the following condition is satisfied: f/R10=−3.15.

In the imaging optical system of the image capturing device according to the 1st embodiment, when a curvature radius of the object-side surface 151 of the fifth lens element 150 is R9, a curvature radius of the image-side surface 152 of the fifth lens element 150 is R10, the following condition is satisfied: (R9+R10)/(R9−R10)=−7.14

In the imaging optical system of the image capturing device according to the 1st embodiment, when the focal length of the imaging optical system is f, a focal length of the third lens element 130 is f3, a focal length of the fourth lens element 140 is f4, the following condition is satisfied: (f/f3)+(f/f4)=0.55.

In the imaging optical system of the image capturing device according to the 1st embodiment, when the focal length of the imaging optical system is f, the focal length of the third lens element 130 is f3, the focal length of the fourth lens element 140 is f4, a focal length of the fifth lens element 150 is f5, a focal length of the sixth lens element 160 is f6, the following condition is satisfied: |f/f3|+|f/f4|+|f/f5|+|f/f6|=1.29.

In the imaging optical system of the image capturing device according to the 1st embodiment, when a vertical distance between a non-axial critical point on the object-side surface 161 of the sixth lens element 160 and an optical axis is Yc61; when a vertical distance between a non-axial critical point on the image-side surface 162 of the sixth lens element 160 and an optical axis is Yc62, the following condition is satisfied: Yc61/Yc62=0.59.

In the imaging optical system of the image capturing device according to the 1st embodiment, when an axial distance between the aperture stop 100 and the image-side surface 162 of the sixth lens element 160 is SD, an axial distance between the object-side surface 111 of the first lens element 110 and the image-side surface 162 of the sixth lens element 160 is TD, the following condition is satisfied: SD/TD=0.82.

In the imaging optical system of the image capturing device according to the 1st embodiment, when an axial distance between the object-side surface 111 of the first lens element 110 and the image surface 180 is TL, a maximal image height of the imaging optical system is ImgH (i.e. half of a diagonal length of an effective photosensitive area of the image sensor 190), the following condition is satisfied: TL/ImgH=1.65.

The detailed optical data of the 1st embodiment are shown in Table 1 and the aspheric surface data are shown in Table 2 below.

TABLE 1

(Embodiment 1)
f = 4.71 mm, Fno = 2.25, HFOV = 37.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.946 | ASP | 0.716 | Plastic | 1.544 | 55.9 | 4.24 |
| 2 | | 10.787 | ASP | 0.115 | | | | |
| 3 | Ape. Stop | Plano | | 0.038 | | | | |
| 4 | Lens 2 | 4.028 | ASP | 0.277 | Plastic | 1.640 | 23.3 | −7.57 |
| 5 | | 2.139 | ASP | 0.380 | | | | |
| 6 | Lens 3 | −33.050 | ASP | 0.480 | Plastic | 1.544 | 55.9 | 7.94 |
| 7 | | −3.842 | ASP | 0.045 | | | | |
| 8 | Lens 4 | 6.135 | ASP | 0.261 | Plastic | 1.544 | 55.9 | −112.29 |
| 9 | | 5.492 | ASP | 0.523 | | | | |
| 10 | Lens 5 | −1.129 | ASP | 0.330 | Plastic | 1.640 | 23.3 | −11.06 |
| 11 | | −1.497 | ASP | 0.050 | | | | |
| 12 | Lens 6 | 2.352 | ASP | 1.431 | Plastic | 1.535 | 55.7 | 20.90 |
| 13 | | 2.346 | ASP | 0.600 | | | | |
| 14 | IR-cut filter | Plano | | 0.200 | Glass | 1.517 | 64.2 | — |
| 15 | | Plano | | 0.504 | | | | |
| 16 | Image | Plano | | — | | | | |

Note:
Reference wavelength is 587.6 nm (d-line).

TABLE 2

Aspheric Coefficients

| Surface # | 1 | 2 | 4 | 5 | 6 | 7 |
|---|---|---|---|---|---|---|
| k= | −1.2376E−01 | −2.9648E+01 | −3.0000E+01 | −8.7875E+00 | −1.5749E+01 | 1.9052E+00 |
| A4= | −4.8953E−04 | −5.5703E−02 | −8.8932E−02 | 5.6313E−03 | −1.9923E−02 | −2.6020E−02 |
| A6= | 3.6053E−03 | 5.3408E−02 | 8.8695E−02 | 2.7231E−02 | −3.5590E−02 | −2.4936E−02 |
| A8= | −4.9337E−03 | −3.1040E−02 | −1.7762E−02 | 2.0834E−02 | 2.5682E−02 | −3.9548E−03 |
| A10= | −1.3998E−03 | 5.0203E−03 | −2.4531E−02 | −2.9247E−02 | −4.9219E−02 | 9.1131E−05 |
| A12= | 3.5748E−03 | 5.8242E−04 | 1.9311E−02 | 1.5494E−02 | 3.5770E−02 | 7.1888E−03 |
| A14= | −1.8484E−03 | −3.9251E−04 | −4.5225E−03 | −8.9284E−04 | | |

| Surface # | 8 | 9 | 10 | 11 | 12 | 13 |
|---|---|---|---|---|---|---|
| k= | 2.1589E+00 | −1.0000E+00 | −5.2029E+00 | −8.8850E−01 | −2.3222E+01 | −7.2949E+00 |
| A4= | −6.9536E−02 | −4.1072E−02 | −3.1473E−02 | 5.2415E−02 | −6.3026E−02 | −2.9256E−02 |
| A6= | −1.8000E−02 | −1.1740E−02 | 2.1140E−02 | −1.4562E−02 | 2.6051E−02 | 8.4586E−03 |
| A8= | 2.9052E−03 | 4.8075E−03 | 1.5473E−02 | 6.3355E−03 | −1.1264E−02 | −2.3987E−03 |
| A10= | 2.2083E−03 | 1.9469E−03 | −4.4506E−03 | 1.1385E−03 | 3.7636E−03 | 4.4706E−04 |
| A12= | 1.8215E−03 | −8.3419E−04 | 4.7068E−05 | −2.7117E−04 | −7.0301E−04 | −5.1986E−05 |
| A14= | 1.3757E−03 | −9.5945E−05 | 1.0676E−04 | −1.3595E−04 | 6.6366E−05 | 3.4192E−06 |
| A16= | −1.3361E−03 | | −1.2244E−05 | 2.4027E−05 | −2.5020E−06 | −9.4722E−08 |

In Table 1, the curvature radius, the thickness and the focal length are shown in millimeters (mm). Surface numbers 0-16 represent the surfaces sequentially arranged from the object-side to the image-side along the optical axis. In Table 2, k represents the conic coefficient of the equation of the aspheric surface profiles. A4-A16 represent the aspheric coefficients ranging from the 4th order to the 16th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 2A:
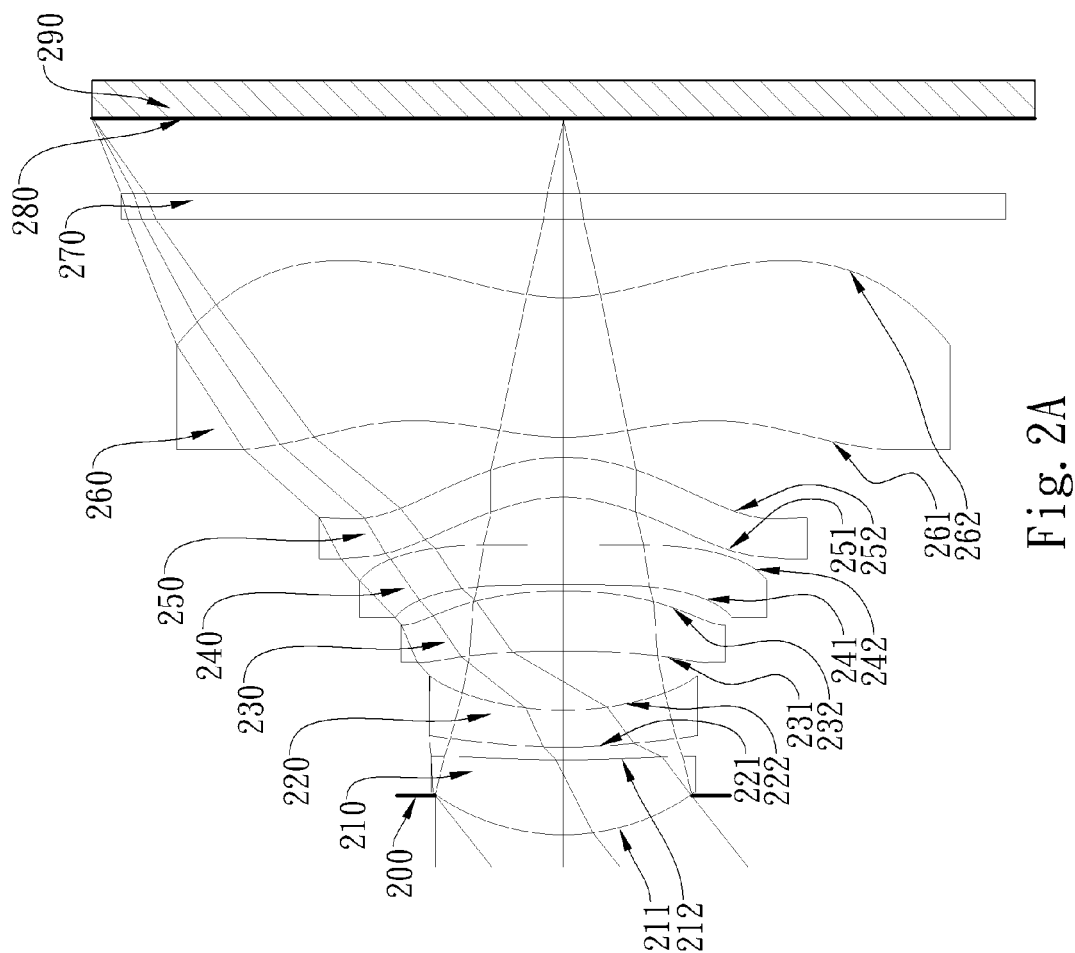
FIG. 2A is a schematic view of an image capturing device according to the 2nd embodiment of the present disclosure.
Figure 2B:
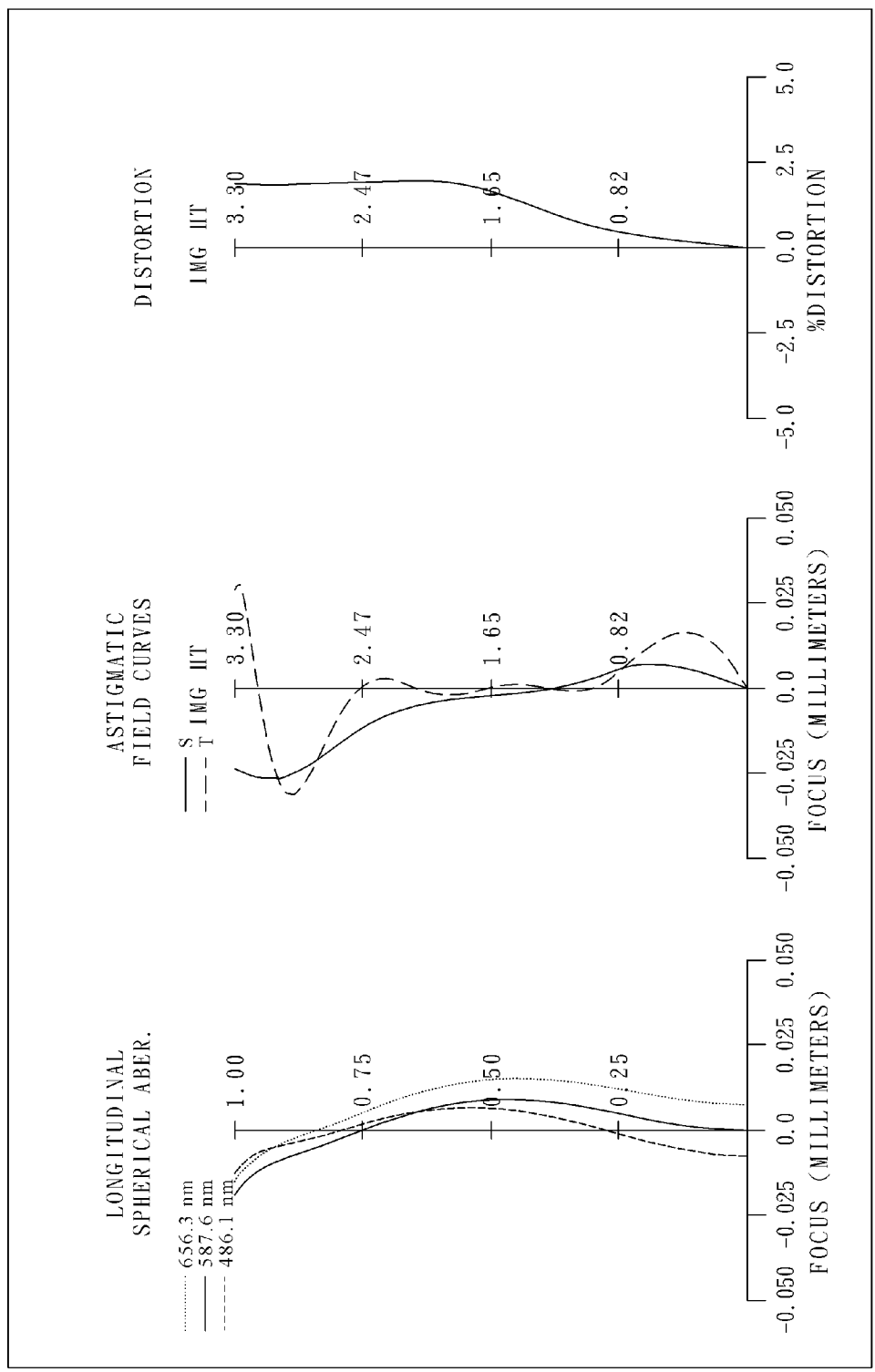
FIG. 2B shows spherical aberration curves, astigmatic field curves and a distortion curve of the image capturing device according to the 2nd embodiment.

FIG. 2A is a schematic view of an image capturing device according to the 2nd embodiment of the present disclosure. FIG. 2B shows, in order from left to right, spherical aberration curves, astigmatic field curves and a distortion curve of the image capturing device according to the 2nd embodiment.

In FIG. 2A, the image capturing device includes the imaging optical system (not otherwise herein labeled) of the present disclosure and an image sensor 290. The imaging optical system includes, in order from an object side to an image side, an aperture stop 200, a first lens element 210, a second lens element 220, a third lens element 230, a fourth lens element 240, a fifth lens element 250, a sixth lens element 260, an IR-cut filter 270 and an image surface 280, wherein the imaging optical system has a total of six lens elements (210-260) with refractive power, which are non-cemented lens element.

The first lens element 210 with positive refractive power in a paraxial region thereof has an object-side surface being convex 211 in a paraxial region thereof and an image-side surface being concave 212 in a paraxial region thereof, which are both aspheric, the first lens element 210 is made of plastic material, and the image-side surface 212 of the second lens element 210 has at least one inflection point.

The second lens element 220 with negative refractive power in a paraxial region thereof has an object-side surface being convex 221 in a paraxial region thereof and an image-side surface being concave 222 in a paraxial region thereof, which are both aspheric, and the second lens element 220 is made of plastic material.

The third lens element 230 with positive refractive power in a paraxial region thereof has an object-side surface being concave 231 in a paraxial region thereof and an image-side surface being convex 232 in a paraxial region thereof, which are both aspheric, the third lens element 230 is made of plastic material, and both of the object-side surface 231 and the image-side surface 232 of the third lens element 230 have at least one inflection point.

The fourth lens element 240 with negative refractive power in a paraxial region thereof has an object-side surface being convex 241 in a paraxial region thereof and an image-side surface being concave 242 in a paraxial region thereof, which are both aspheric, the fourth lens element 240 is made of plastic material, and both of the object-side surface 241 and the image-side surface 242 of the fourth lens element 240 have at least one inflection point.

The fifth lens element 250 with negative refractive power in a paraxial region thereof has an object-side surface being concave 251 in a paraxial region thereof and an image-side surface being convex 252 in a paraxial region thereof, which are both aspheric, the fifth lens element 250 is made of plastic material, and both of the object-side surface 251 and the image-side surface 252 of the fifth lens element 250 have at least one inflection point.

The sixth lens element 260 with positive refractive power in a paraxial region thereof has an object-side surface being convex 261 in a paraxial region thereof and an image-side surface being concave 262 in a paraxial region thereof, which are both aspheric, the sixth lens element 260 is made of plastic material, and both of the object-side surface 261 and the image-side surface 262 of the sixth lens element 260 have at least one inflection point.

The IR-cut filter 270 is made of glass and located between the sixth lens element 260 and the image surface 280, and will not affect the focal length of the imaging optical system. The image sensor 290 is disposed on or near the image surface 280 of the imaging optical system.

The detailed optical data of the 2nd embodiment are shown in Table 3 and the aspheric surface data are shown in Table 4 below.

TABLE 3

(Embodiment 2)
f = 4.10 mm, Fno = 2.28, HFOV = 38.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.273 | | | | |
| 2 | Lens 1 | 1.588 | ASP | 0.526 | Plastic | 1.544 | 55.9 | 3.49 |
| 3 | | 8.559 | ASP | 0.087 | | | | |
| 4 | Lens 2 | 3.579 | ASP | 0.260 | Plastic | 1.650 | 21.4 | −7.94 |
| 5 | | 2.053 | ASP | 0.417 | | | | |
| 6 | Lens 3 | −7.649 | ASP | 0.422 | Plastic | 1.544 | 55.9 | 8.04 |
| 7 | | −2.836 | ASP | 0.040 | | | | |
| 8 | Lens 4 | 100.000 | ASP | 0.280 | Plastic | 1.544 | 55.9 | −32.88 |
| 9 | | 15.161 | ASP | 0.339 | | | | |
| 10 | Lens 5 | −1.022 | ASP | 0.280 | Plastic | 1.650 | 21.4 | −9.68 |
| 11 | | −1.353 | ASP | 0.140 | | | | |
| 12 | Lens 6 | 1.639 | ASP | 0.982 | Plastic | 1.535 | 55.7 | 19.39 |
| 13 | | 1.540 | ASP | 0.550 | | | | |
| 14 | IR-cut filter | Plano | | 0.183 | Glass | 1.517 | 64.2 | — |
| 15 | | Plano | | 0.526 | | | | |
| 16 | Image | Plano | | — | | | | |

Note:
Reference wavelength is 587.6 nm (d-line).

TABLE 4

Aspheric Coefficients

| Surface # | | | | | |
|---|---|---|---|---|---|
| 2 | 3 | 4 | 5 | 6 | 7 |
| k = −1.6796E−02 | −3.0000E+01 | −8.8579E+00 | −5.1744E+00 | −2.3561E+01 | −1.2975E+00 |
| A4 = 5.2509E−03 | −6.0541E−02 | −1.0272E−01 | 2.3206E−02 | −2.3496E−02 | −2.4413E−02 |
| A6 = 3.7251E−03 | 8.0994E−02 | 1.1809E−01 | 4.1835E−02 | −5.2821E−02 | −4.3946E−02 |
| A8 = −3.0059E−03 | −6.4321E−02 | −4.9414E−02 | 3.7705E−02 | 7.9653E−02 | 1.5648E−02 |
| A10 = 1.2920E−03 | 1.7660E−02 | −3.6747E−02 | −7.0872E−02 | −9.3420E−02 | 4.4518E−03 |
| A12 = 3.3335E−03 | 1.5172E−02 | 6.4754E−02 | 6.0922E−02 | 6.9484E−02 | 1.3371E−02 |
| A14 = −5.64383E−03 | −1.58654E−02 | −2.52473E−02 | 3.34424E−03 | | |

| Surface # | | | | | |
|---|---|---|---|---|---|
| 8 | 9 | 10 | 11 | 12 | 13 |
| k = −3.0000E+01 | −1.0000E+00 | −5.3021E+00 | −1.0882E+00 | −1.2884E+01 | −6.9522E+00 |
| A4 = −9.9209E−02 | −7.6957E−02 | −3.1285E−02 | 8.0519E−02 | −9.4714E−02 | −4.4798E−02 |
| A6 = −1.2426E−02 | −9.3300E−04 | 1.2759E−03 | −2.5065E−02 | 4.0530E−02 | 1.3103E−02 |
| A8 = 1.0115E−04 | 8.3727E−03 | 2.7806E−02 | 1.0912E−02 | −2.0735E−02 | −4.4092E−03 |
| A10 = 4.9664E−03 | 1.8768E−03 | −9.5256E−03 | 2.2738E−03 | 8.2539E−03 | 9.7971E−04 |
| A12 = 4.9529E−03 | −2.8641E−03 | 2.2363E−04 | −7.3463E−04 | −1.8288E−03 | −1.3552E−04 |
| A14 = 3.1699E−03 | 8.5286E−05 | 3.2621E−04 | −4.1517E−04 | 2.0551E−04 | 1.0562E−05 |
| A16 = −7.0718E−03 | | −7.2793E−05 | 9.2219E−05 | −9.2819E−06 | −3.5436E−07 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 4.10 | (R9 + R10)/(R9 − R10) | −7.20 |
| Fno | 2.28 | (f/f3) + (f/f4) | 0.39 |
| HFOV [deg.] | 38.3 | \|f/f3\| + \|f/f4\| + \|f/f5\| + \|f/f6\| | 1.27 |

-continued

| 2nd Embodiment | | | |
|---|---|---|---|
| CT3/CT2 | 1.62 | Yc61/Yc62 | 0.67 |
| T45/CT5 | 1.21 | SD/TD | 0.93 |
| f/R8 | 0.27 | TL/ImgH | 1.52 |
| f/R10 | −3.03 | | |

3rd Embodiment

Figure 3A:
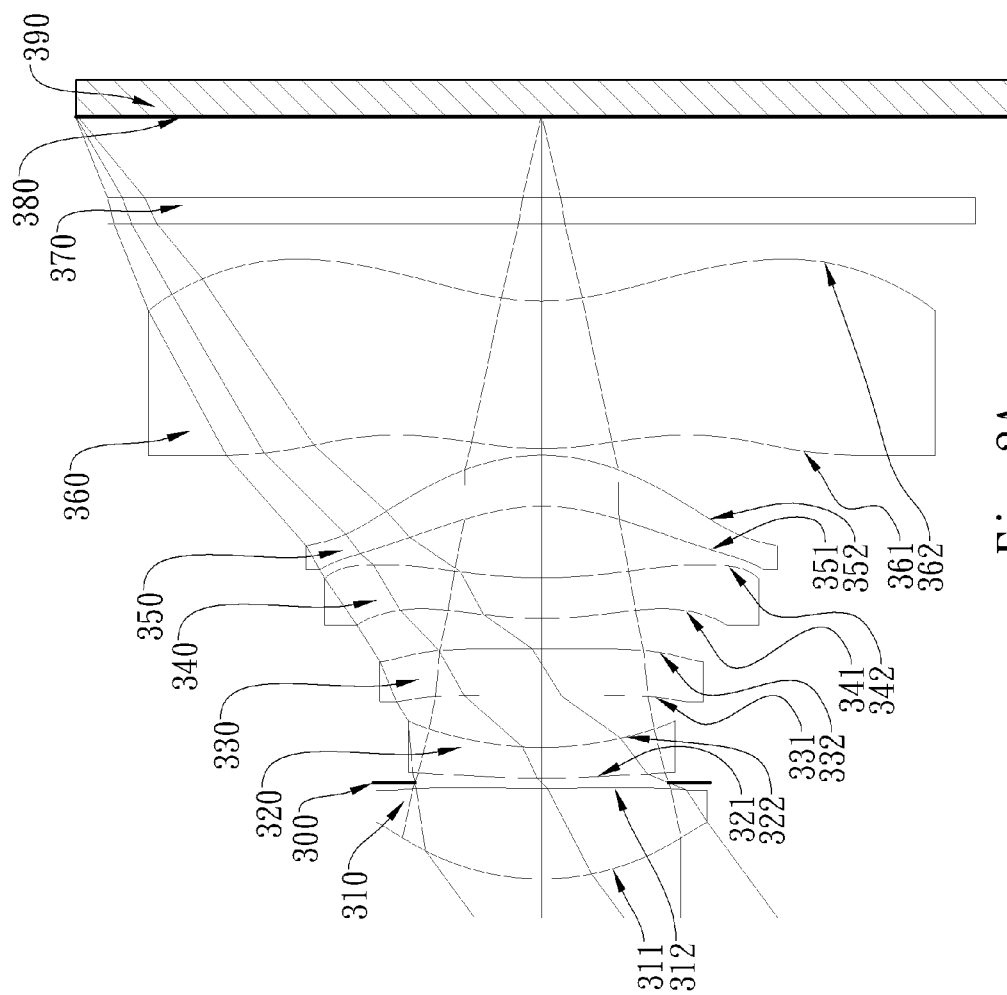
FIG. 3A is a schematic view of an image capturing device according to the 3rd embodiment of the present disclosure.
Figure 3B:
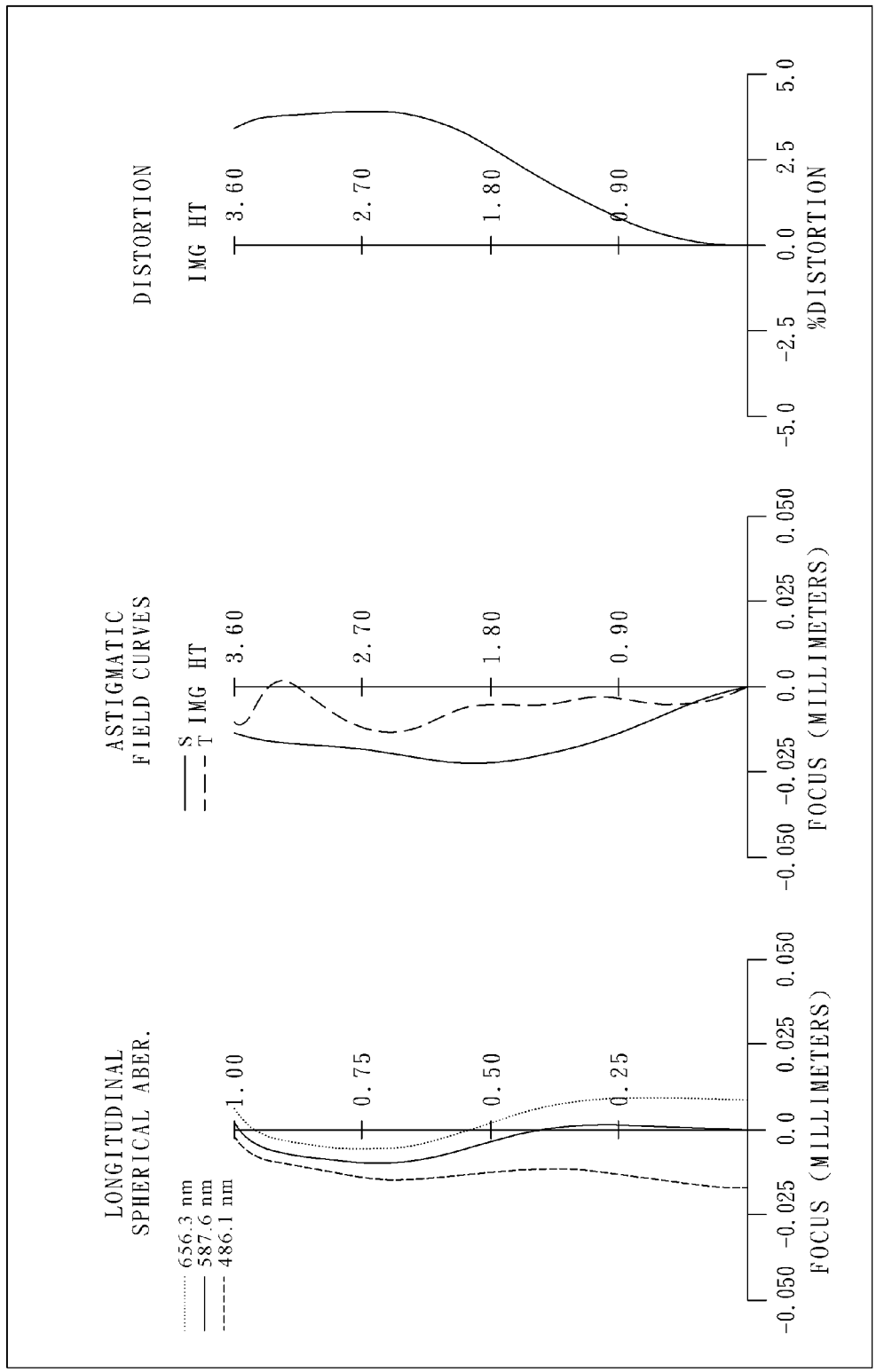
FIG. 3B shows spherical aberration curves, astigmatic field curves and a distortion curve of the image capturing device according to the 3rd embodiment.

FIG. 3A is a schematic view of an image capturing device according to the 3rd embodiment of the present disclosure. FIG. 3B shows, in order from left to right, spherical aberration curves, astigmatic field curves and a distortion curve of the image capturing device according to the 3rd embodiment.

In FIG. 3A, the image capturing device includes the imaging optical system (not otherwise herein labeled) of the present disclosure and an image sensor 390. The imaging optical system includes, in order from an object side to an image side, a first lens element 310, an aperture stop 300, a second lens element 320, a third lens element 330, a fourth lens element 340, a fifth lens element 350, a sixth lens element 360, an IR-cut filter 370 and an image surface 380, wherein the imaging optical system has a total of six lens elements (310-360) with refractive power, which are non-cemented lens element.

The first lens element 310 with positive refractive power in a paraxial region thereof has an object-side surface being convex 311 in a paraxial region thereof and an image-side surface being concave 312 in a paraxial region thereof, which are both aspheric, the first lens element 310 is made of plastic material, and both of the object-side surface 311 and the image-side surface 312 of the first lens element 310 have at least one inflection point.

The second lens element 320 with negative refractive power in a paraxial region thereof has an object-side surface being convex 321 in a paraxial region thereof and an image-side surface being concave 322 in a paraxial region thereof, which are both aspheric, the second lens element 320 is made of plastic material, and the object-side surface 321 of the second lens element 320 has at least one inflection point.

The third lens element 330 with positive refractive power in a paraxial region thereof has an object-side surface being convex 331 in a paraxial region thereof and an image-side surface being concave 332 in a paraxial region thereof, which are both aspheric, the third lens element 330 is made of plastic material, and both of the object-side surface 331 and the image-side surface 332 of the third lens element 330 have at least one inflection point.

The fourth lens element 340 with positive refractive power in a paraxial region thereof has an object-side surface being convex 341 in a paraxial region thereof and an image-side surface being concave 342 in a paraxial region thereof, which are both aspheric, the fourth lens element 340 is made of plastic material, and both of the object-side surface 341 and the image-side surface 342 of the fourth lens element 340 have at least one inflection point.

The fifth lens element 350 with positive refractive power in a paraxial region thereof has an object-side surface being concave 351 in a paraxial region thereof and an image-side surface being convex 352 in a paraxial region thereof, which are both aspheric, the fifth lens element 350 is made of plastic material, and both of the object-side surface 351 and the image-side surface 352 of the fifth lens element 350 have at least one inflection point.

The sixth lens element 360 with positive refractive power in a paraxial region thereof has an object-side surface being convex 361 in a paraxial region thereof and an image-side surface being concave 362 in a paraxial region thereof, which are both aspheric, the sixth lens element 360 is made of plastic material, and both of the object-side surface 361 and the image-side surface 362 of the sixth lens element 360 have at least one inflection point.

The IR-cut filter 370 is made of glass and located between the sixth lens element 360 and the image surface 380, and will not affect the focal length of the imaging optical system. The image sensor 390 is disposed on or near the image surface 380 of the imaging optical system.

The detailed optical data of the 3rd embodiment are shown in Table 5 and the aspheric surface data are shown in Table 6 below.

TABLE 5

(Embodiment 3)
f = 4.74 mm, Fno = 2.20, HFOV = 36.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.956 | ASP | 0.701 | Plastic | 1.544 | 55.9 | 3.94 |
| 2 | | 19.528 | ASP | 0.045 | | | | |
| 3 | Ape. Stop | Plano | | 0.032 | | | | |
| 4 | Lens 2 | 5.172 | ASP | 0.240 | Plastic | 1.640 | 23.3 | −7.23 |
| 5 | | 2.397 | ASP | 0.398 | | | | |
| 6 | Lens 3 | 30.670 | ASP | 0.365 | Plastic | 1.544 | 55.9 | 210.27 |
| 7 | | 41.726 | ASP | 0.235 | | | | |
| 8 | Lens 4 | 3.016 | ASP | 0.315 | Plastic | 1.544 | 55.9 | 21.90 |
| 9 | | 3.889 | ASP | 0.555 | | | | |
| 10 | Lens 5 | −1.411 | ASP | 0.393 | Plastic | 1.544 | 55.9 | 150.22 |
| 11 | | −1.523 | ASP | 0.050 | | | | |
| 12 | Lens 6 | 2.188 | ASP | 1.142 | Plastic | 1.535 | 55.7 | 172.78 |
| 13 | | 1.834 | ASP | 0.600 | | | | |
| 14 | IR-cut filter | Plano | | 0.200 | Glass | 1.517 | 64.2 | — |
| 15 | | Plano | | 0.625 | | | | |
| 16 | Image | Plano | | — | | | | |

Note:
Reference wavelength is 587.6 nm (d-line).

TABLE 6

Aspheric Coefficients

| Surface # | | | | | | |
|---|---|---|---|---|---|---|
| | 1 | 2 | 4 | 5 | 6 | 7 |
| k = | -8.6729E-02 | 3.0000E+00 | -1.5490E+01 | -6.3207E+00 | 3.0000E+00 | 3.0000E+00 |
| A4 = | 1.6725E-03 | -5.6043E-02 | -1.0190E-01 | -7.3839E-03 | -7.8835E-03 | -5.0116E-02 |
| A6 = | 2.1900E-03 | 5.3370E-02 | 8.6736E-02 | 1.4285E-02 | -4.3196E-02 | 4.3814E-04 |
| A8 = | -3.2743E-03 | -3.1864E-02 | -2.0543E-02 | 2.0993E-02 | 3.2410E-02 | -9.6348E-03 |
| A10 = | -1.5989E-03 | 6.1535E-03 | -1.9651E-02 | -2.5055E-02 | -5.2262E-02 | -4.5452E-03 |
| A12 = | 2.8519E-03 | 2.5376E-04 | 2.3820E-02 | 1.4700E-02 | 2.9588E-02 | 6.9418E-03 |
| A14 = | -1.7944E-03 | -3.5538E-04 | -7.2111E-03 | -2.7394E-04 | | |

| Surface # | | | | | | |
|---|---|---|---|---|---|---|
| | 8 | 9 | 10 | 11 | 12 | 13 |
| k = | -3.6054E+00 | -1.0000E+00 | -8.2723E+00 | -7.3546E-01 | -1.4063E+01 | -5.4606E+00 |
| A4 = | -7.1792E-02 | -2.1818E-02 | -1.9900E-02 | 3.6913E-02 | -7.0662E-02 | -3.5878E-02 |
| A6 = | -9.5484E-03 | -2.3499E-02 | -3.6439E-04 | -1.6036E-02 | 2.6141E-02 | 9.8724E-03 |
| A8 = | -2.9556E-03 | 5.2323E-03 | 1.3355E-02 | 6.7622E-03 | -1.1210E-02 | -2.5913E-03 |
| A10 = | -1.8234E-03 | 2.8101E-03 | -4.7593E-03 | 1.2158E-03 | 3.7714E-03 | 4.5718E-04 |
| A12 = | 2.0584E-03 | -8.3953E-04 | 3.5695E-05 | -2.6598E-04 | -7.0303E-04 | -5.1376E-05 |
| A14 = | 2.1996E-03 | -5.5393E-05 | 1.1733E-04 | -1.3702E-04 | 6.6227E-05 | 3.3528E-06 |
| A16 = | -1.0954E-03 | | -6.4194E-06 | 2.4006E-05 | -2.5166E-06 | -9.5884E-08 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 4.74 | (R9 + R10)/(R9 − R10) | -26.15 |
| Fno | 2.20 | (f/f3) + (f/f4) | 0.24 |
| HFOV [deg.] | 36.4 | |f/f3| + |f/f4| + |f/f5| + |f/f6| | 0.30 |
| CT3/CT2 | 1.52 | Yc61/Yc62 | 0.60 |
| T45/CT5 | 1.41 | SD/TD | 0.83 |
| f/R8 | 1.22 | TL/ImgH | 1.64 |
| f/R10 | -3.11 | | |

4th Embodiment

Figure 4A:
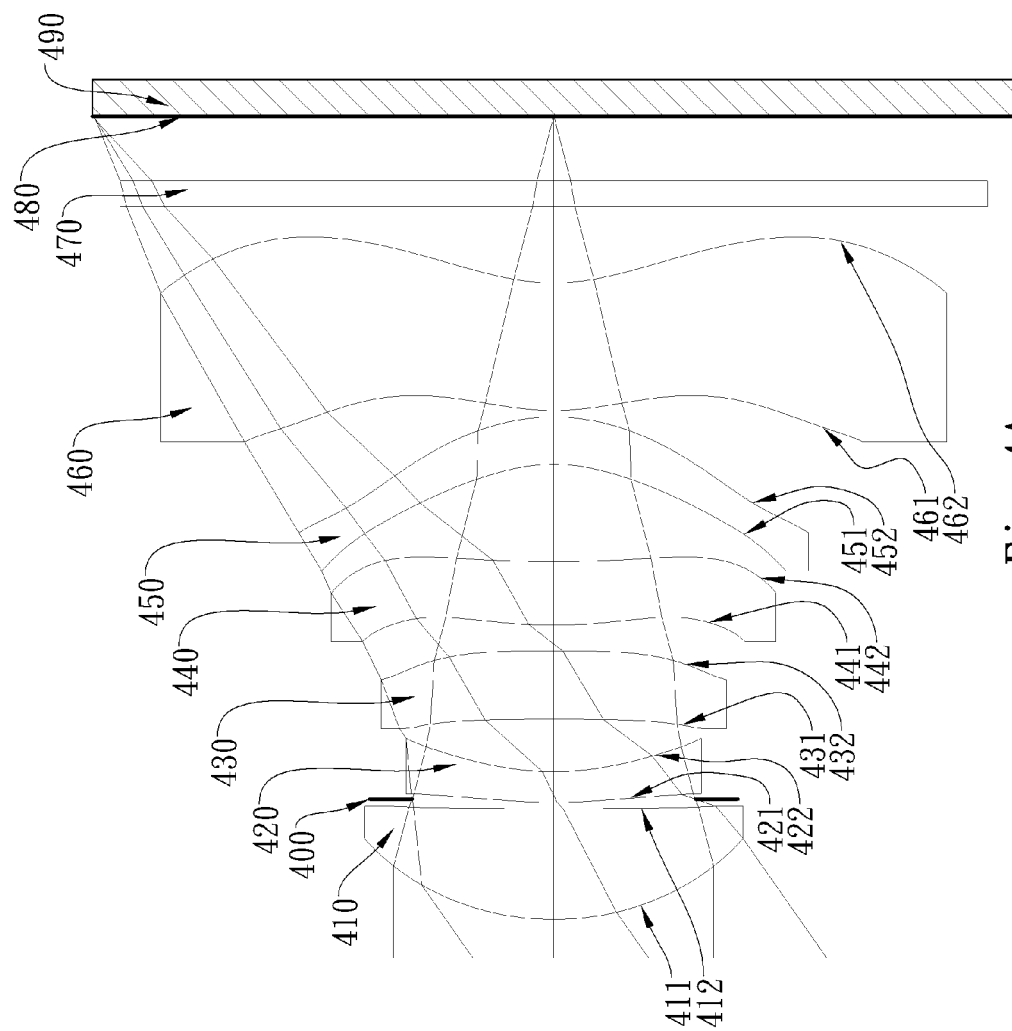
FIG. 4A is a schematic view of an image capturing device according to the 4th embodiment of the present disclosure.
Figure 4B:
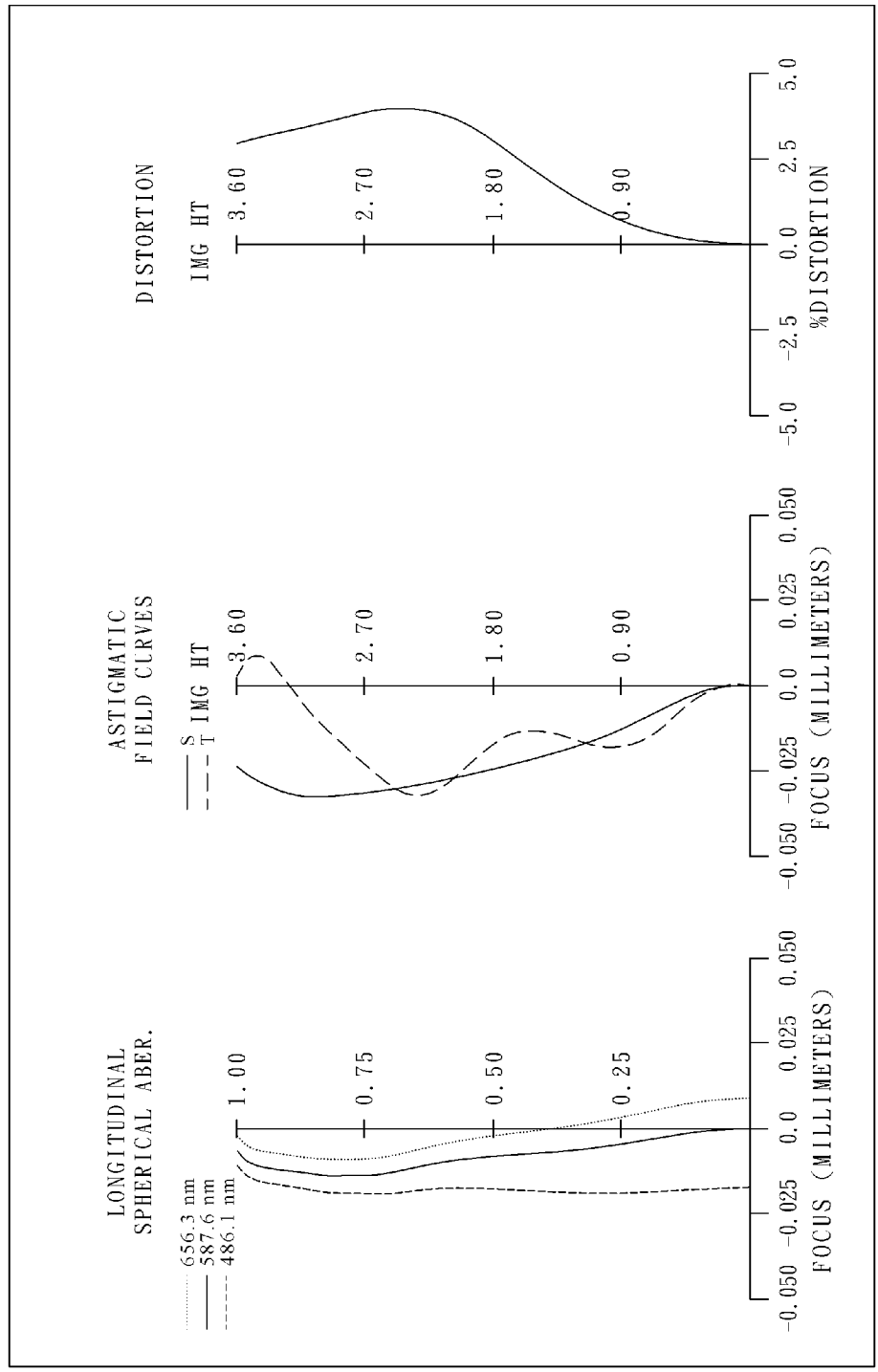
FIG. 4B shows spherical aberration curves, astigmatic field curves and a distortion curve of the image capturing device according to the 4th embodiment.

FIG. 4A is a schematic view of an image capturing device according to the 4th embodiment of the present disclosure. FIG. 4B shows, in order from left to right, spherical aberration curves, astigmatic field curves and a distortion curve of the image capturing device according to the 4th embodiment.

In FIG. 4A, the image capturing device includes the imaging optical system (not otherwise herein labeled) of the present disclosure and an image sensor 490. The imaging optical system includes, in order from an object side to an image side, a first lens element 410, an aperture stop 400, a second lens element 420, a third lens element 430, a fourth lens element 440, a fifth lens element 450, a sixth lens element 460, an IR-cut filter 470 and an image surface 480, wherein the imaging optical system has a total of six lens elements (410-460) with refractive power, which are non-cemented lens element.

The first lens element 410 with positive refractive power in a paraxial region thereof has an object-side surface being convex 411 in a paraxial region thereof and an image-side surface being concave 412 in a paraxial region thereof, which are both aspheric, the first lens element 410 is made of plastic material, and both of the object-side surface 411 and the image-side surface 412 of the first lens element 410 have at least one inflection point.

The second lens element 420 with negative refractive power in a paraxial region thereof has an object-side surface being convex 421 in a paraxial region thereof and an image-side surface being concave 422 in a paraxial region thereof, which are both aspheric, the second lens element 420 is made of plastic material, and the object-side surface 421 of the second lens element 420 has at least one inflection point.

The third lens element 430 with positive refractive power in a paraxial region thereof has an object-side surface being concave 431 in a paraxial region thereof and an image-side surface being convex 432 in a paraxial region thereof, which are both aspheric, the third lens element 430 is made of plastic material, and both of the object-side surface 431 and the image-side surface 432 of the third lens element 430 have at least one inflection point.

The fourth lens element 440 with positive refractive power in a paraxial region thereof has an object-side surface being convex 441 in a paraxial region thereof and an image-side surface being concave 442 in a paraxial region thereof, which are both aspheric, the fourth lens element 440 is made of plastic material, and both of the object-side surface 441 and the image-side surface 442 of the fourth lens element 440 have at least one inflection point.

The fifth lens element 450 with negative refractive power in a paraxial region thereof has an object-side surface being concave 451 in a paraxial region thereof and an image-side surface being convex 452 in a paraxial region thereof, which are both aspheric, the fifth lens element 450 is made of plastic material, and both of the object-side surface 451 and the image-side surface 452 of the fifth lens element 450 have at least one inflection point.

The sixth lens element 460 with positive refractive power in a paraxial region thereof has an object-side surface being convex 461 in a paraxial region thereof and an image-side surface being concave 462 in a paraxial region thereof, which are both aspheric, the sixth lens element 460 is made of plastic material, and both of the object-side surface 461 and the image-side surface 462 of the sixth lens element 460 have at least one inflection point.

The IR-cut filter 470 is made of glass and located between the sixth lens element 460 and the image surface 480, and will not affect the focal length of the imaging optical system. The image sensor 490 is disposed on or near the image surface 480 of the imaging optical system.

The detailed optical data of the 4th embodiment are shown in Table 7 and the aspheric surface data are shown in Table 8 below.

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

TABLE 7

(Embodiment 4)
f = 5.01 mm, Fno = 2.00, HFOV = 35.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.135 | ASP | 0.867 | Plastic | 1.544 | 55.9 | 4.19 |
| 2 | | 28.413 | ASP | 0.076 | | | | |
| 3 | Ape. Stop | Plano | | −0.026 | | | | |
| 4 | Lens 2 | 4.107 | ASP | 0.240 | Plastic | 1.640 | 23.3 | −7.16 |
| 5 | | 2.116 | ASP | 0.412 | | | | |
| 6 | Lens 3 | −27.946 | ASP | 0.535 | Plastic | 1.544 | 55.9 | 464.42 |
| 7 | | −25.333 | ASP | 0.201 | | | | |
| 8 | Lens 4 | 3.599 | ASP | 0.497 | Plastic | 1.544 | 55.9 | 10.20 |
| 9 | | 9.735 | ASP | 0.765 | | | | |
| 10 | Lens 5 | −1.224 | ASP | 0.369 | Plastic | 1.544 | 55.9 | −14.77 |
| 11 | | −1.597 | ASP | 0.050 | | | | |
| 12 | Lens 6 | 1.794 | ASP | 1.000 | Plastic | 1.535 | 55.7 | 33.62 |
| 13 | | 1.605 | ASP | 0.600 | | | | |
| 14 | IR-cut filter | Plano | | 0.200 | Glass | 1.517 | 64.2 | — |
| 15 | | Plano | | 0.505 | | | | |
| 16 | Image | Plano | | — | | | | |

Note:
Reference wavelength is 587.6 nm (d-line).

40

TABLE 8

Aspheric Coefficients

| | Surface # | | | | |
|---|---|---|---|---|---|
| | 1 | 2 | 4 | 5 | 6 | 7 |
| k = | −2.2785E−02 | −3.0000E+01 | −1.5383E+00 | −4.4543E+00 | −3.0000E+01 | 3.0000E+00 |
| A4 = | 3.6870E−03 | −3.1482E−02 | −1.0065E−01 | −1.4482E−02 | −6.3867E−03 | −7.8856E−02 |
| A6 = | −1.4207E−03 | 4.6828E−02 | 6.1147E−02 | −1.0406E−03 | −3.8791E−02 | 6.4645E−03 |
| A8 = | 2.7996E−03 | −3.4597E−02 | −1.6412E−02 | 2.1903E−02 | 4.6639E−02 | −5.5884E−03 |
| A10 = | −9.1188E−04 | 1.2151E−02 | −1.7312E−02 | −2.1535E−02 | −5.3344E−02 | 5.2117E−04 |
| A12 = | −1.0287E−04 | −2.4616E−04 | 2.0285E−02 | 8.0771E−03 | 2.3590E−02 | 2.3063E−03 |
| A14 = | 1.2364E−04 | −5.8028E−04 | −6.0231E−03 | 9.0011E−04 | | |

| | Surface # | | | | |
|---|---|---|---|---|---|
| | 8 | 9 | 10 | 11 | 12 | 13 |
| k = | −6.0829E−01 | −1.0000E+00 | −7.6111E+00 | −5.6575E−01 | −1.3040E+01 | −5.4087E+00 |
| A4 = | −6.8743E−02 | 7.6515E−03 | −4.1197E−02 | 3.8342E−02 | −7.8870E−02 | −3.6041E−02 |
| A6 = | −1.0825E−02 | −2.5087E−02 | −7.3067E−03 | −1.9952E−02 | 2.7434E−02 | 1.0290E−02 |
| A8 = | −2.6535E−03 | 1.7813E−03 | 1.6033E−02 | 6.1135E−03 | −1.1677E−02 | −2.7380E−03 |
| A10 = | −1.6006E−03 | 1.9891E−03 | −4.5683E−03 | 1.3683E−03 | 3.7974E−03 | 4.7626E−04 |
| A12 = | 1.0115E−03 | −8.3235E−04 | −1.2575E−04 | −2.0682E−04 | −6.9518E−04 | −5.1947E−05 |
| A14 = | 1.7511E−03 | 9.0906E−05 | 8.2435E−05 | −1.2981E−04 | 6.6459E−05 | 3.2537E−06 |
| A16 = | −6.9981E−04 | | 8.4330E−06 | 2.0785E−05 | −2.6706E−06 | −8.8821E−08 |

| 4th Embodiment | | | |
|---|---|---|---|
| f [mm] | 5.01 | (R9 + R10)/(R9 − R10) | −7.56 |
| Fno | 2.00 | (f/f3) + (f/f4) | 0.50 |
| HFOV [deg.] | 35.0 | \|f/f3\| + \|f/f4\| + \|f/f5\| + \|f/f6\| | 0.99 |
| CT3/CT2 | 2.23 | Yc61/Yc62 | 0.57 |
| T45/CT5 | 2.07 | SD/TD | 0.81 |
| f/R8 | 0.51 | TL/ImgH | 1.75 |
| f/R10 | −3.14 | | |

5th Embodiment

Figure 5A:
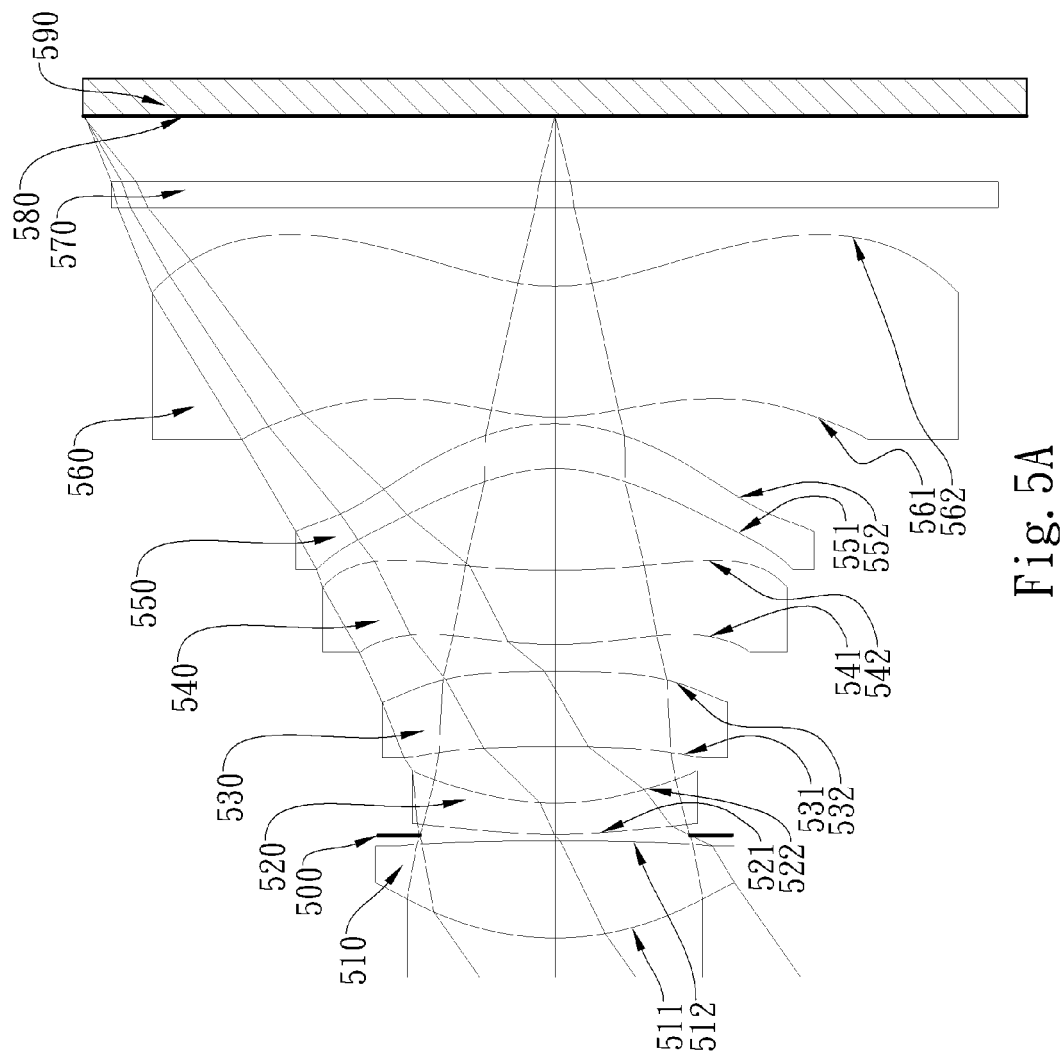
FIG. 5A is a schematic view of an image capturing device according to the 5th embodiment of the present disclosure.
Figure 5B:
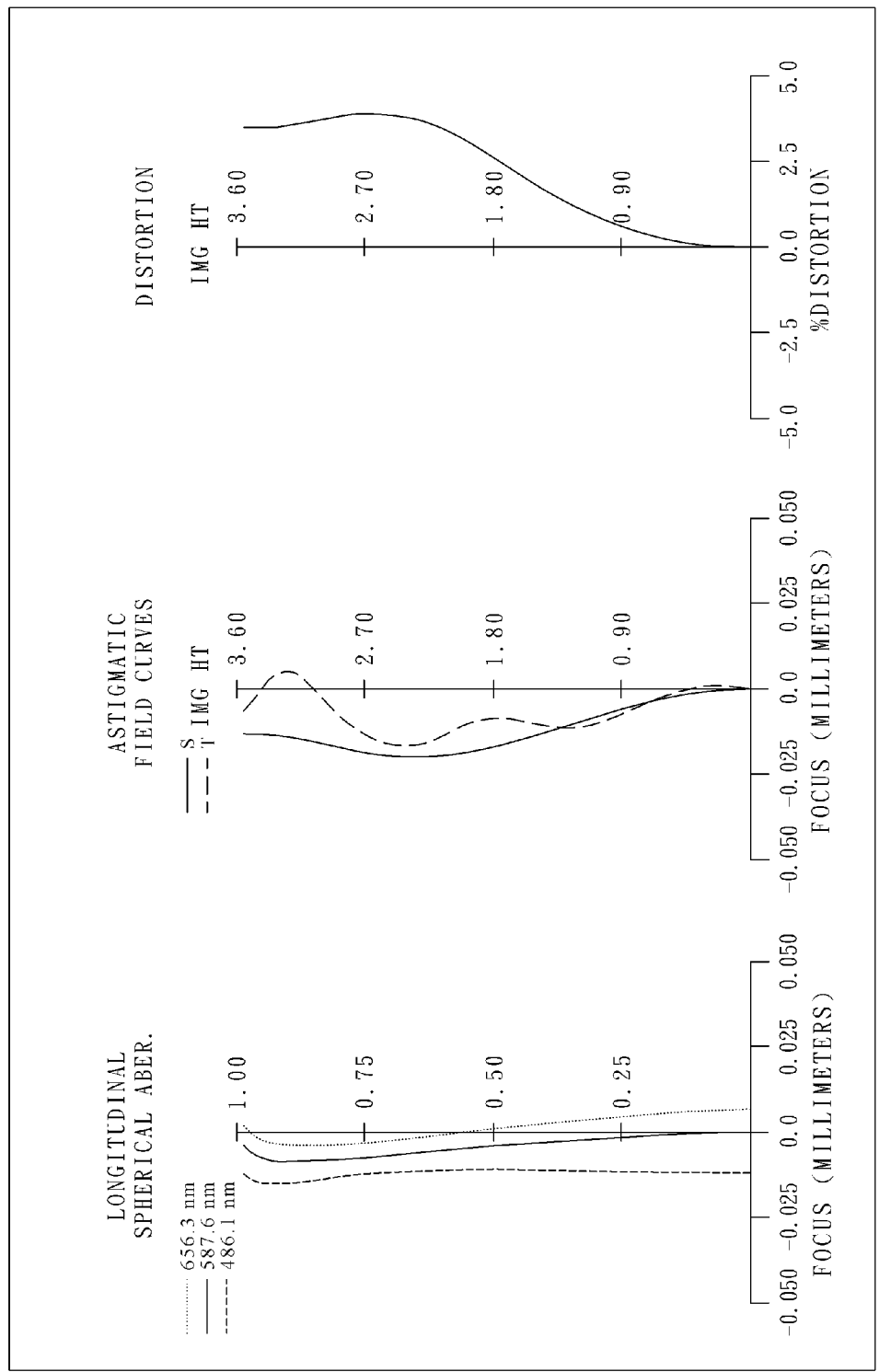
FIG. 5B shows spherical aberration curves, astigmatic field curves and a distortion curve of the image capturing device according to the 5th embodiment.

FIG. 5A is a schematic view of an image capturing device according to the 5th embodiment of the present disclosure. FIG. 5B shows, in order from left to right, spherical aberration curves, astigmatic field curves and a distortion curve of the image capturing device according to the 5th embodiment.

In FIG. 5A, the image capturing device includes the imaging optical system (not otherwise herein labeled) of the present disclosure and an image sensor 590. The imaging optical system includes, in order from an object side to an image side, a first lens element 510, an aperture stop 500, a second lens element 520, a third lens element 530, a fourth lens element 540, a fifth lens element 550, a sixth lens element 560, an IR-cut filter 570 and an image surface 580, wherein the imaging optical system has a total of six lens elements (510-560) with refractive power, which are non-cemented lens element.

The first lens element 510 with positive refractive power in a paraxial region thereof has an object-side surface being convex 511 in a paraxial region thereof and an image-side surface being convex 512 in a paraxial region thereof, which are both aspheric, the first lens element 510 is made of plastic material, and the object-side surface 511 of the first lens element 510 has at least one inflection point.

The second lens element 520 with negative refractive power in a paraxial region thereof has an object-side surface being convex 521 in a paraxial region thereof and an image-side surface being concave 522 in a paraxial region thereof, which are both aspheric, and the second lens element 520 is made of plastic material.

The third lens element 530 with positive refractive power in a paraxial region thereof has an object-side surface being concave 531 in a paraxial region thereof and an image-side surface being convex 532 in a paraxial region thereof, which are both aspheric, the third lens element 530 is made of plastic material, and both of the object-side surface 531 and the image-side surface 532 of the third lens element 530 have at least one inflection point.

The fourth lens element 540 with positive refractive power in a paraxial region thereof has an object-side surface being convex 541 in a paraxial region thereof and an image-side surface being concave 542 in a paraxial region thereof, which are both aspheric, the fourth lens element 540 is made of plastic material, and both of the object-side surface 541 and the image-side surface 542 of the fourth lens element 540 have at least one inflection point.

The fifth lens element 550 with negative refractive power in a paraxial region thereof has an object-side surface being concave 551 in a paraxial region thereof and an image-side surface being convex 552 in a paraxial region thereof, which are both aspheric, the fifth lens element 550 is made of plastic material, and the image-side surface 552 of the fifth lens element 550 has at least one inflection point.

The sixth lens element 560 with positive refractive power in a paraxial region thereof has an object-side surface being convex 561 in a paraxial region thereof and an image-side surface being concave 562 in a paraxial region thereof, which are both aspheric, the sixth lens element 560 is made of plastic material, and both of the object-side surface 561 and the image-side surface 562 of the sixth lens element 560 have at least one inflection point.

The IR-cut filter 570 is made of glass and located between the sixth lens element 560 and the image surface 580, and will not affect the focal length of the imaging optical system. The image sensor 590 is disposed on or near the image surface 580 of the imaging optical system.

The detailed optical data of the 5th embodiment are shown in Table 9 and the aspheric surface data are shown in Table 10 below.

TABLE 9

(Embodiment 5)
f = 4.97 mm, Fno = 2.20, HFOV = 35.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.226 | ASP | 0.742 | Plastic | 1.544 | 55.9 | 3.93 |
| 2 | | −47.506 | ASP | 0.045 | | | | |
| 3 | Ape. Stop | Plano | | 0.005 | | | | |
| 4 | Lens 2 | 4.060 | ASP | 0.240 | Plastic | 1.640 | 23.3 | −6.66 |
| 5 | | 2.030 | ASP | 0.431 | | | | |
| 6 | Lens 3 | −13.781 | ASP | 0.578 | Plastic | 1.544 | 55.9 | 773.50 |
| 7 | | −13.542 | ASP | 0.207 | | | | |
| 8 | Lens 4 | 3.286 | ASP | 0.566 | Plastic | 1.544 | 55.9 | 11.85 |
| 9 | | 6.296 | ASP | 0.780 | | | | |
| 10 | Lens 5 | −1.178 | ASP | 0.343 | Plastic | 1.544 | 55.9 | −16.47 |
| 11 | | −1.495 | ASP | 0.050 | | | | |
| 12 | Lens 6 | 1.771 | ASP | 1.000 | Plastic | 1.535 | 55.7 | 33.41 |
| 13 | | 1.579 | ASP | 0.600 | | | | |
| 14 | IR-cut filter | Plano | | 0.200 | Glass | 1.517 | 64.2 | — |
| 15 | | Plano | | 0.503 | | | | |
| 16 | Image | Plano | | — | | | | |

Note:
Reference wavelength is 587.6 nm (d-line).

TABLE 10

Aspheric Coefficients

| Surface # | 1 | 2 | 4 | 5 | 6 | 7 |
|---|---|---|---|---|---|---|
| k = | −1.6402E−01 | −3.0000E+01 | 1.5488E+00 | −4.2139E+00 | −7.1170E−01 | −2.7178E+01 |
| A4 = | 9.5428E−04 | −2.2801E−02 | −9.2921E−02 | −1.4123E−02 | −5.7866E−03 | −8.0415E−02 |
| A6 = | −1.0219E−03 | 2.9509E−02 | 4.8227E−02 | 4.4715E−04 | −3.7558E−02 | 9.2025E−03 |
| A8 = | −1.3766E−03 | −2.9179E−02 | −6.8103E−03 | 2.1494E−02 | 3.9278E−02 | −4.7580E−03 |
| A10 = | −1.8517E−04 | 1.5792E−02 | −1.4091E−02 | −1.9900E−02 | −4.8715E−02 | −4.0579E−04 |
| A12 = | −7.7639E−05 | −4.7484E−03 | 1.7909E−02 | 1.0996E−02 | 2.5683E−02 | 2.5045E−03 |
| A14 = | −1.4092E−04 | 4.8414E−04 | −6.2772E−03 | −4.5826E−04 | | |

| Surface # | 8 | 9 | 10 | 11 | 12 | 13 |
|---|---|---|---|---|---|---|
| k = | −9.1389E−01 | −1.0000E+00 | −6.4643E+00 | −5.3265E−01 | −1.1635E+01 | −5.2026E+00 |
| A4 = | −7.1200E−02 | 5.0665E−03 | −3.0145E−02 | 5.6319E−02 | −7.4130E−02 | −3.6333E−02 |
| A6 = | −4.8038E−03 | −2.2094E−02 | −1.2112E−02 | −1.8302E−02 | 3.1626E−02 | 1.1204E−02 |
| A8 = | −2.0006E−03 | 2.9198E−03 | 1.7350E−02 | 5.6458E−03 | −1.3034E−02 | −2.9103E−03 |
| A10 = | −2.0600E−04 | 1.7775E−03 | −4.2115E−03 | 1.3468E−03 | 3.7959E−03 | 4.9163E−04 |
| A12 = | 2.5870E−05 | −8.8184E−04 | −1.1857E−04 | −2.0054E−04 | −6.7686E−04 | −5.2524E−05 |
| A14 = | 1.1870E−03 | 9.2243E−05 | 6.8234E−05 | −1.2703E−04 | 6.7579E−05 | 3.1855E−06 |
| A16 = | −4.3122E−04 | | 2.5848E−06 | 2.1612E−05 | −2.9429E−06 | −8.3228E−08 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 4.97 | (R9 + R10)/(R9 − R10) | −8.42 |
| Fno | 2.20 | (f/f3) + (f/f4) | 0.43 |
| HFOV [deg.] | 35.0 | \|f/f3\| + \|f/f4\| + \|f/f5\| + \|f/f6\| | 0.88 |
| CT3/CT2 | 2.41 | Yc61/Yc62 | 0.60 |
| T45/CT5 | 2.27 | SD/TD | 0.84 |
| f/R8 | 0.79 | TL/ImgH | 1.75 |
| f/R10 | −3.33 | | |

6th Embodiment

Figure 6A:
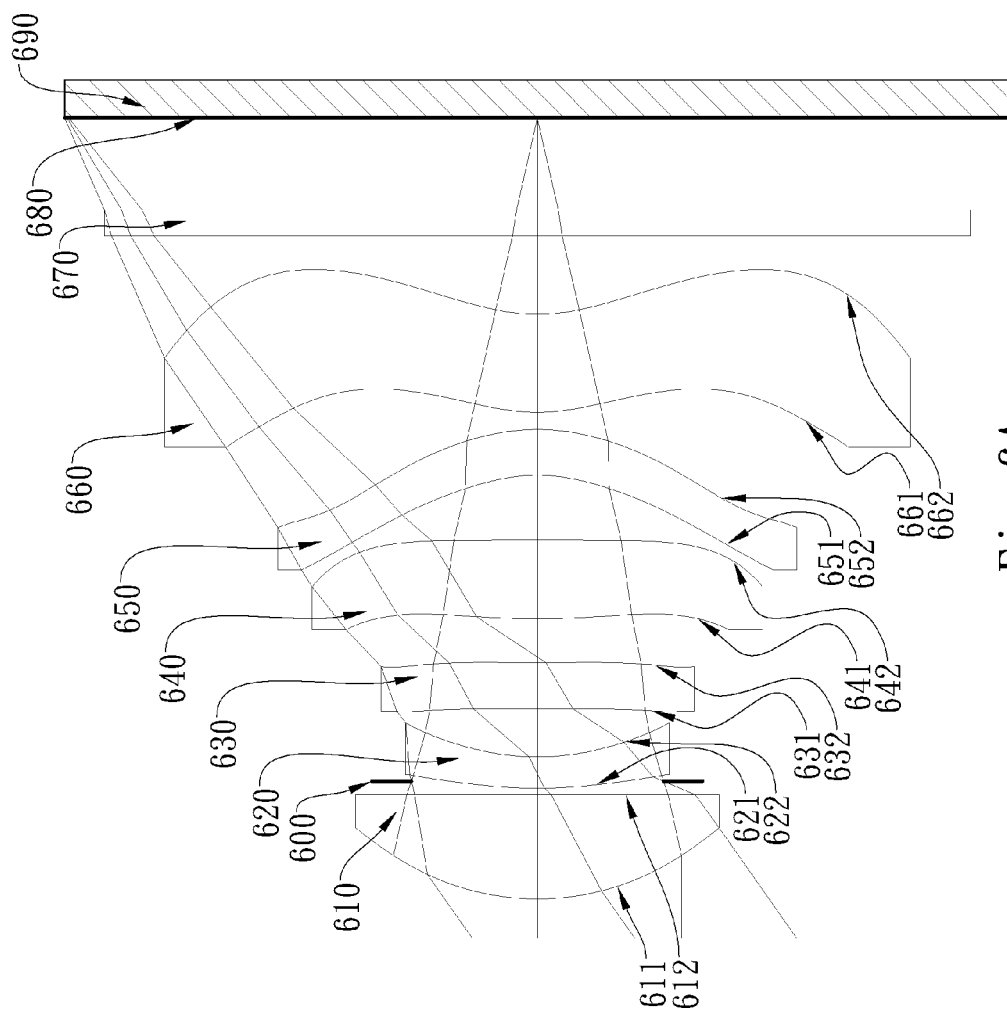
FIG. 6A is a schematic view of an image capturing device according to the 6th embodiment of the present disclosure.
Figure 6B:
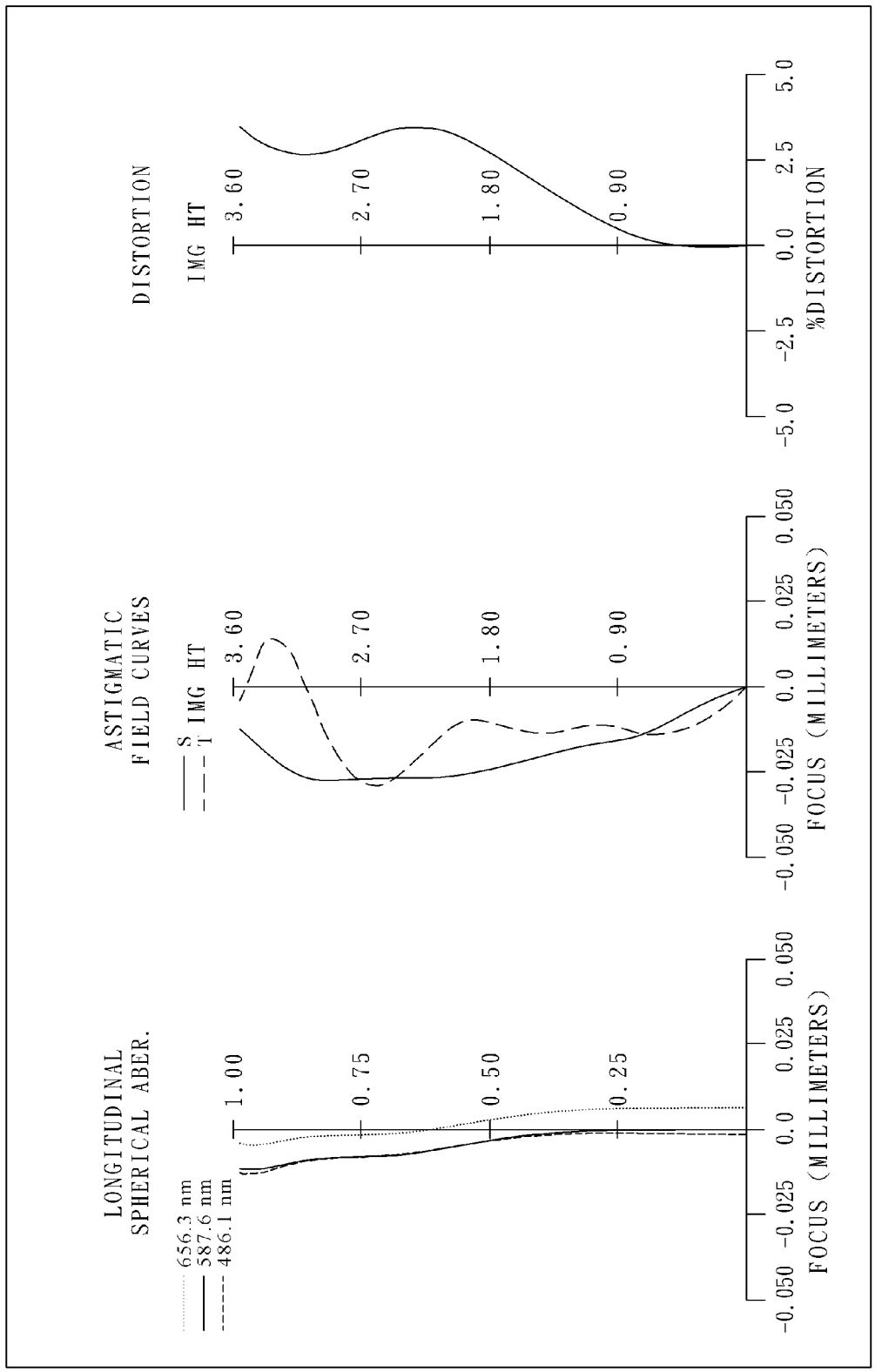
FIG. 6B shows spherical aberration curves, astigmatic field curves and a distortion curve of the image capturing device according to the 6th embodiment.

FIG. 6A is a schematic view of an image capturing device according to the 6th embodiment of the present disclosure. FIG. 6B shows, in order from left to right, spherical aberration curves, astigmatic field curves and a distortion curve of the image capturing device according to the 6th embodiment.

In FIG. 6A, the image capturing device includes the imaging optical system (not otherwise herein labeled) of the present disclosure and an image sensor 690. The imaging optical system includes, in order from an object side to an image side, a first lens element 610, an aperture stop 600, a second lens element 620, a third lens element 630, a fourth lens element 640, a fifth lens element 650, a sixth lens element 660, an IR-cut filter 670 and an image surface 680, wherein the imaging optical system has a total of six lens elements (610-660) with refractive power, which are non-cemented lens element.

The first lens element 610 with positive refractive power in a paraxial region thereof has an object-side surface being convex 611 in a paraxial region thereof and an image-side surface being concave 612 in a paraxial region thereof, which are both aspheric, the first lens element 610 is made of plastic material, and both of the object-side surface 611 and the image-side surface 612 of the first lens element 610 have at least one inflection point.

The second lens element 620 with negative refractive power in a paraxial region thereof has an object-side surface being convex 621 in a paraxial region thereof and an image-side surface being concave 622 in a paraxial region thereof, which are both aspheric, and the second lens element 620 is made of plastic material.

The third lens element 630 with negative refractive power in a paraxial region thereof has an object-side surface being convex 631 in a paraxial region thereof and an image-side surface being concave 632 in a paraxial region thereof, which are both aspheric, the third lens element 630 is made of plastic material, and both of the object-side surface 631 and the image-side surface 632 of the third lens element 630 have at least one inflection point.

The fourth lens element 640 with positive refractive power in a paraxial region thereof has an object-side surface being convex 641 in a paraxial region thereof and an image-side surface being convex 642 in a paraxial region thereof, which are both aspheric, the fourth lens element 640 is made of plastic material, and the object-side surface 641 of the fourth lens element 640 has at least one inflection point.

The fifth lens element 650 with negative refractive power in a paraxial region thereof has an object-side surface being concave 651 in a paraxial region thereof and an image-side surface being convex 652 in a paraxial region thereof, which are both aspheric, the fifth lens element 650 is made of plastic material, and both of the object-side surface 651 and the image-side surface 652 of the fifth lens element 650 have at least one inflection point.

The sixth lens element 660 with positive refractive power in a paraxial region thereof has an object-side surface being convex 661 in a paraxial region thereof and an image-side surface being concave 662 in a paraxial region thereof, which are both aspheric, the sixth lens element 660 is made of plastic material, and both of the object-side surface 661 and the image-side surface 662 of the sixth lens element 660 have at least one inflection point.

The IR-cut filter 670 is made of glass and located between the sixth lens element 660 and the image surface 680, and will not affect the focal length of the imaging optical system. The image sensor 690 is disposed on or near the image surface 680 of the imaging optical system.

The detailed optical data of the 6th embodiment are shown in Table 11 and the aspheric surface data are shown in Table 12 below.

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

TABLE 11

(Embodiment 6)
f = 4.96 mm, Fno = 2.25, HFOV = 35.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.977 | ASP | 0.798 | Plastic | 1.544 | 55.9 | 3.66 |
| 2 | | 210.602 | ASP | 0.103 | | | | |
| 3 | Ape. Stop | Plano | | −0.053 | | | | |
| 4 | Lens 2 | 3.521 | ASP | 0.240 | Plastic | 1.650 | 21.4 | −6.22 |
| 5 | | 1.831 | ASP | 0.368 | | | | |
| 6 | Lens 3 | 76.853 | ASP | 0.354 | Plastic | 1.639 | 23.5 | −57.26 |
| 7 | | 24.745 | ASP | 0.335 | | | | |
| 8 | Lens 4 | 5.468 | ASP | 0.602 | Plastic | 1.544 | 55.9 | 10.01 |
| 9 | | −1331.867 | ASP | 0.500 | | | | |
| 10 | Lens 5 | −1.216 | ASP | 0.349 | Plastic | 1.544 | 55.9 | −12.24 |
| 11 | | −1.638 | ASP | 0.133 | | | | |
| 12 | Lens 6 | 1.457 | ASP | 0.750 | Plastic | 1.535 | 55.7 | 19.85 |
| 13 | | 1.386 | ASP | 0.600 | | | | |
| 14 | IR-cut filter | Plano | | 0.200 | Glass | 1.517 | 64.2 | — |
| 15 | | Plano | | 0.707 | | | | |
| 16 | Image | Plano | | — | | | | |

Note:
Reference wavelength is 587.6 nm (d-line).

TABLE 12

Aspheric Coefficients

| | Surface # | | | | | |
|---|---|---|---|---|---|---|
| | 1 | 2 | 4 | 5 | 6 | 7 |
| k = | −1.3178E−01 | −3.0000E+01 | 2.7885E+00 | −4.2812E+00 | −3.0000E+01 | 3.0000E+00 |
| A4 = | 1.9976E−03 | −3.9903E−03 | −7.8085E−02 | 1.3621E−02 | −3.6605E−02 | −6.5302E−02 |
| A6 = | 1.1970E−03 | 1.1594E−02 | 4.5122E−02 | 8.7693E−03 | −9.1585E−03 | 1.3803E−02 |
| A8 = | −2.3814E−03 | −1.8666E−02 | −1.9062E−02 | 1.3198E−02 | 3.4910E−02 | −2.0024E−03 |
| A10 = | 4.5295E−04 | 1.7439E−02 | −4.8633E−02 | −1.9415E−02 | −4.2167E−02 | 6.8109E−04 |
| A12 = | 3.7042E−04 | −9.1321E−03 | 1.6287E−02 | 1.5726E−02 | 2.5755E−02 | 4.5403E−03 |
| A14 = | −2.8191E−04 | 1.8818E−03 | −7.5118E−03 | −2.0368E−03 | | |

| | Surface # | | | | | |
|---|---|---|---|---|---|---|
| | 8 | 9 | 10 | 11 | 12 | 13 |
| k = | 3.0000E+00 | −1.0000E+00 | −7.0246E+00 | −4.5586E−01 | −7.0986E+00 | −4.8321E+00 |
| A4 = | −5.1424E−02 | 1.0582E−03 | −3.1688E−02 | 4.9501E−02 | −9.0946E−02 | −4.8811E−02 |
| A6 = | −7.7752E−03 | −1.8216E−02 | −1.5626E−02 | −1.8563E−02 | 3.5626E−02 | 1.3595E−02 |
| A8 = | −1.0724E−03 | 8.6852E−04 | 1.6227E−02 | 5.7093E−03 | −1.3815E−02 | −3.3652E−03 |
| A10 = | −3.7094E−04 | 1.5993E−03 | −3.8885E−03 | 1.3704E−03 | 3.7490E−03 | 5.1738E−04 |
| A12 = | −1.9258E−04 | −7.6727E−04 | 3.2471E−05 | −1.9421E−04 | −6.5823E−04 | −5.1433E−05 |
| A14 = | 1.2504E−03 | 1.0091E−04 | 9.0588E−05 | −1.2685E−04 | 7.0080E−05 | 3.0162E−06 |
| A16 = | −4.1406E−04 | | −6.2844E−06 | 2.0624E−05 | −3.3853E−06 | −7.6161E−08 |

| 6th Embodiment | | | |
|---|---|---|---|
| f [mm] | 4.96 | (R9 + R10)/(R9 − R10) | −6.76 |
| Fno | 2.25 | (f/f3) + (f/f4) | 0.41 |
| HFOV [deg.] | 35.1 | \|f/f3\| + \|f/f4\| + \|f/f5\| + \|f/f6\| | 1.24 |
| CT3/CT2 | 1.48 | Yc61/Yc62 | 0.72 |
| T45/CT5 | 1.43 | SD/TD | 0.80 |
| f/R8 | −0.004 | TL/ImgH | 1.66 |
| f/R10 | −3.03 | | |

7th Embodiment

Figure 7A:
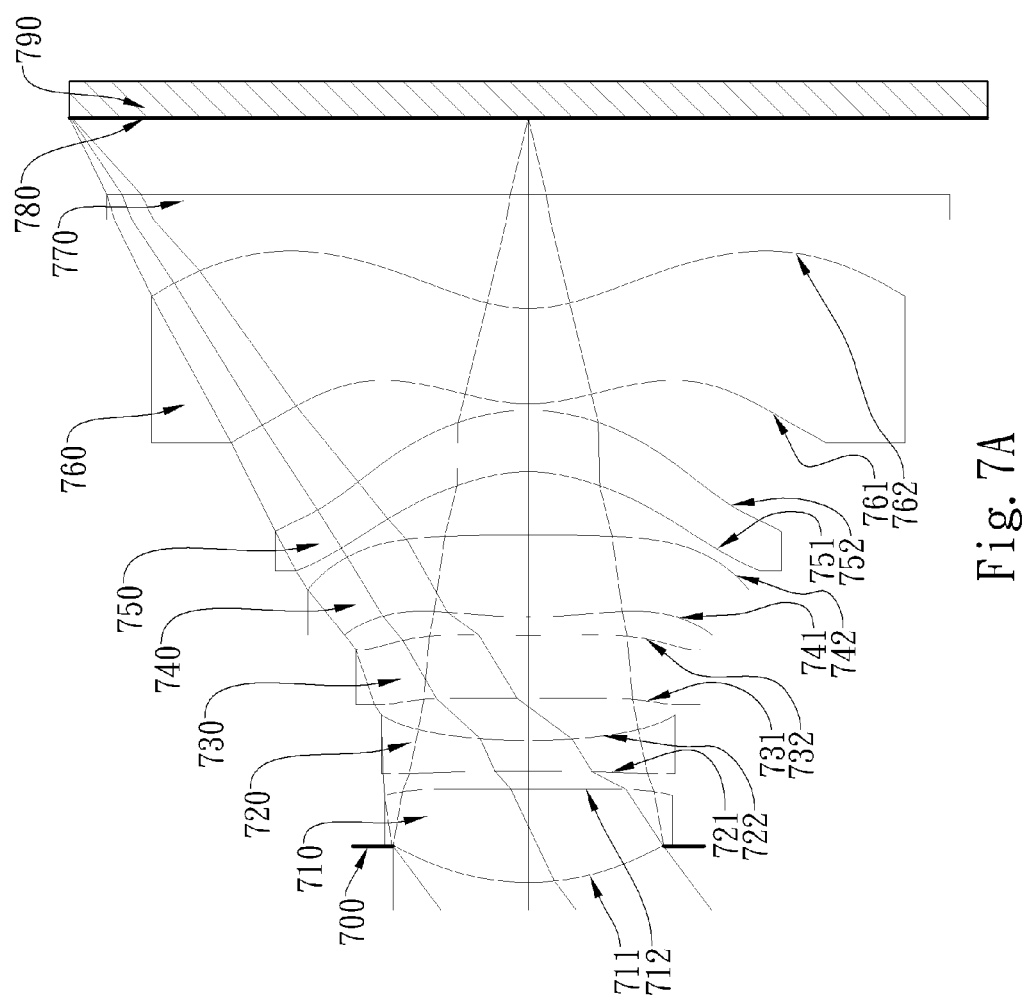
FIG. 7A is a schematic view of an image capturing device according to the 7th embodiment of the present disclosure.
Figure 7B:
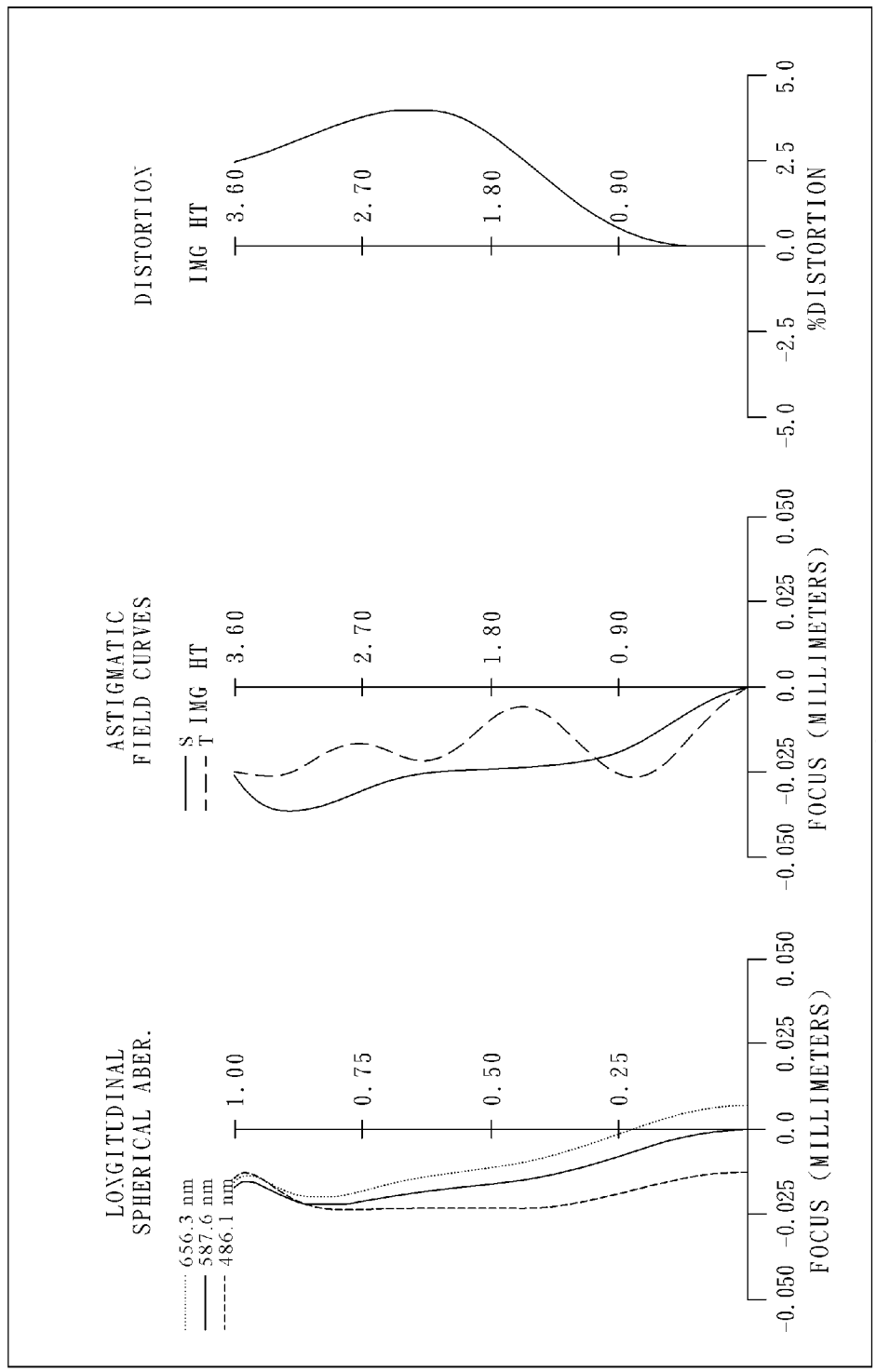
FIG. 7B shows spherical aberration curves, astigmatic field curves and a distortion curve of the image capturing device according to the 7th embodiment.

FIG. 7A is a schematic view of an image capturing device according to the 7th embodiment of the present disclosure. FIG. 7B shows, in order from left to right, spherical aberration curves, astigmatic field curves and a distortion curve of the image capturing device according to the 7th embodiment.

In FIG. 7A, the image capturing device includes the imaging optical system (not otherwise herein labeled) of the present disclosure and an image sensor 790. The imaging optical system includes, in order from an object side to an image side, an aperture stop 700, a first lens element 710, a second lens element 720, a third lens element 730, a fourth lens element 740, a fifth lens element 750, a sixth lens element 760, an IR-cut filter 770 and an image surface 780, wherein the imaging optical system has a total of six lens elements (710-760) with refractive power, which are non-cemented lens element.

The first lens element 710 with positive refractive power in a paraxial region thereof has an object-side surface being convex 711 in a paraxial region thereof and an image-side surface being concave 712 in a paraxial region thereof, which are both aspheric, the first lens element 710 is made of plastic material, and both of the object-side surface 711 and the image-side surface 712 of the first lens element 710 have at least one inflection point.

The second lens element 720 with negative refractive power in a paraxial region thereof has an object-side surface being concave 721 in a paraxial region thereof and an image-side surface being concave 722 in a paraxial region thereof, which are both aspheric, the second lens element 720 is made of plastic material, and the object-side surface 721 of the second lens element 720 has at least one inflection point.

The third lens element 730 with negative refractive power in a paraxial region thereof has an object-side surface being convex 731 in a paraxial region thereof and an image-side surface being concave 732 in a paraxial region thereof, which are both aspheric, the third lens element 730 is made of plastic material, and both of the object-side surface 731 and the image-side surface 732 of the third lens element 730 have at least one inflection point.

The fourth lens element 740 with positive refractive power in a paraxial region thereof has an object-side surface being convex 741 in a paraxial region thereof and an image-side surface being convex 742 in a paraxial region thereof, which are both aspheric, the fourth lens element 740 is made of plastic material, and the object-side surface 741 of the fourth lens element 740 has at least one inflection point.

The fifth lens element 750 with negative refractive power in a paraxial region thereof has an object-side surface being concave 751 in a paraxial region thereof and an image-side surface being convex 752 in a paraxial region thereof, which are both aspheric, the fifth lens element 750 is made of plastic material, and both of the object-side surface 751 and the image-side surface 752 of the fifth lens element 750 have at least one inflection point.

The sixth lens element 760 with positive refractive power in a paraxial region thereof has an object-side surface being convex 761 in a paraxial region thereof and an image-side surface being concave 762 in a paraxial region thereof, which are both aspheric, the sixth lens element 760 is made of plastic material, and both of the object-side surface 761 and the image-side surface 762 of the sixth lens element 760 have at least one inflection point.

The IR-cut filter 770 is made of glass and located between the sixth lens element 760 and the image surface 780, and will not affect the focal length of the imaging optical system. The image sensor 790 is disposed on or near the image surface 780 of the imaging optical system.

The detailed optical data of the 7th embodiment are shown in Table 13 and the aspheric surface data are shown in Table 14 below.

TABLE 13

(Embodiment 7)
f = 4.68 mm, Fno = 2.20, HFOV = 37.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.284 | | | | |
| 2 | Lens 1 | 2.000 | ASP | 0.738 | Plastic | 1.544 | 55.9 | 3.86 |
| 3 | | 36.837 | ASP | 0.140 | | | | |
| 4 | Lens 2 | −31.746 | ASP | 0.240 | Plastic | 1.640 | 23.3 | −6.51 |
| 5 | | 4.809 | ASP | 0.333 | | | | |
| 6 | Lens 3 | 28.928 | ASP | 0.495 | Plastic | 1.544 | 55.9 | −38.48 |
| 7 | | 12.073 | ASP | 0.146 | | | | |
| 8 | Lens 4 | 4.229 | ASP | 0.644 | Plastic | 1.544 | 55.9 | 6.82 |
| 9 | | −28.503 | ASP | 0.500 | | | | |
| 10 | Lens 5 | −1.187 | ASP | 0.484 | Plastic | 1.544 | 55.9 | −15.39 |
| 11 | | −1.582 | ASP | 0.052 | | | | |
| 12 | Lens 6 | 1.325 | ASP | 0.750 | Plastic | 1.535 | 55.7 | 36.98 |
| 13 | | 1.140 | ASP | 0.700 | | | | |
| 14 | IR-cut filter | Plano | | 0.200 | Glass | 1.517 | 64.2 | — |
| 15 | | Plano | | 0.601 | | | | |
| 16 | Image | Plano | | — | | | | |

Note:
Reference wavelength is 587.6 nm (d-line).

TABLE 14

Aspheric Coefficients

| Surface # | | | | | |
|---|---|---|---|---|---|
| 2 | 3 | 4 | 5 | 6 | 7 |
| k = −1.9730E−01 | 3.0000E+00 | −3.0000E+01 | −3.0000E+01 | −3.0000E+01 | 3.0000E+00 |
| A4 = 6.3571E−04 | −4.0532E−02 | −4.5120E−02 | 2.0030E−02 | −3.7173E−02 | −8.5224E−02 |
| A6 = −1.4676E−03 | 2.1186E−02 | 6.6740E−02 | 3.0872E−02 | −2.8189E−02 | −4.2549E−03 |
| A8 = −2.5802E−03 | −2.2903E−02 | −2.7739E−02 | −9.8569E−04 | 4.6865E−02 | 4.5370E−03 |
| A10 = −1.4041E−03 | 5.7760E−03 | −1.6472E−02 | −2.5071E−02 | −5.3475E−02 | −2.1764E−03 |
| A12 = 1.2142E−03 | −1.2432E−03 | 2.2957E−02 | 2.3050E−02 | 2.3943E−02 | 3.1100E−03 |
| A14 = −1.9570E−03 | −5.1327E−04 | −6.5631E−03 | −4.4402E−03 | | |

| Surface # | | | | | |
|---|---|---|---|---|---|
| 8 | 9 | 10 | 11 | 12 | 13 |
| k = −1.0230E+00 | −1.0000E+00 | −7.8961E+00 | −6.1896E−01 | −6.3599E+00 | −3.8954E+00 |
| A4 = −6.9897E−02 | −2.5438E−03 | −7.4898E−02 | 2.4552E−02 | −9.1022E−02 | −4.6369E−02 |
| A6 = −1.2751E−02 | −1.9929E−02 | −2.2130E−02 | −1.9238E−02 | 2.4757E−02 | 1.1186E−02 |
| A8 = −3.7431E−03 | −1.7930E−05 | 1.6766E−02 | 6.5577E−03 | −1.1218E−02 | −2.6734E−03 |
| A10 = 1.5888E−04 | 2.2881E−03 | −4.1846E−03 | 1.4095E−03 | 3.8341E−03 | 4.6530E−04 |
| A12 = 1.0670E−03 | −6.0729E−04 | −1.0196E−05 | −2.1251E−04 | −6.9667E−04 | −5.1885E−05 |
| A14 = 1.4605E−03 | 3.5287E−05 | 9.0320E−05 | −1.3304E−04 | 6.6076E−05 | 3.3063E−06 |
| A16 = −6.7243E−04 | | −4.4949E−06 | 2.0793E−05 | −2.7209E−06 | −9.0921E−08 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 4.68 | (R9 + R10)/(R9 − R10) | −7.01 |
| Fno | 2.20 | (f/f3) + (f/f4) | 0.57 |
| HFOV [deg.] | 37.0 | \|f/f3\| + \|f/f4\| + \|f/f5\| + \|f/f6\| | 1.24 |
| CT3/CT2 | 2.06 | Yc61/Yc62 | 0.61 |
| T45/CT5 | 1.03 | SD/TD | 0.94 |
| f/R8 | −0.16 | TL/ImgH | 1.67 |
| f/R10 | −2.96 | | |

8th Embodiment

Figure 8A:
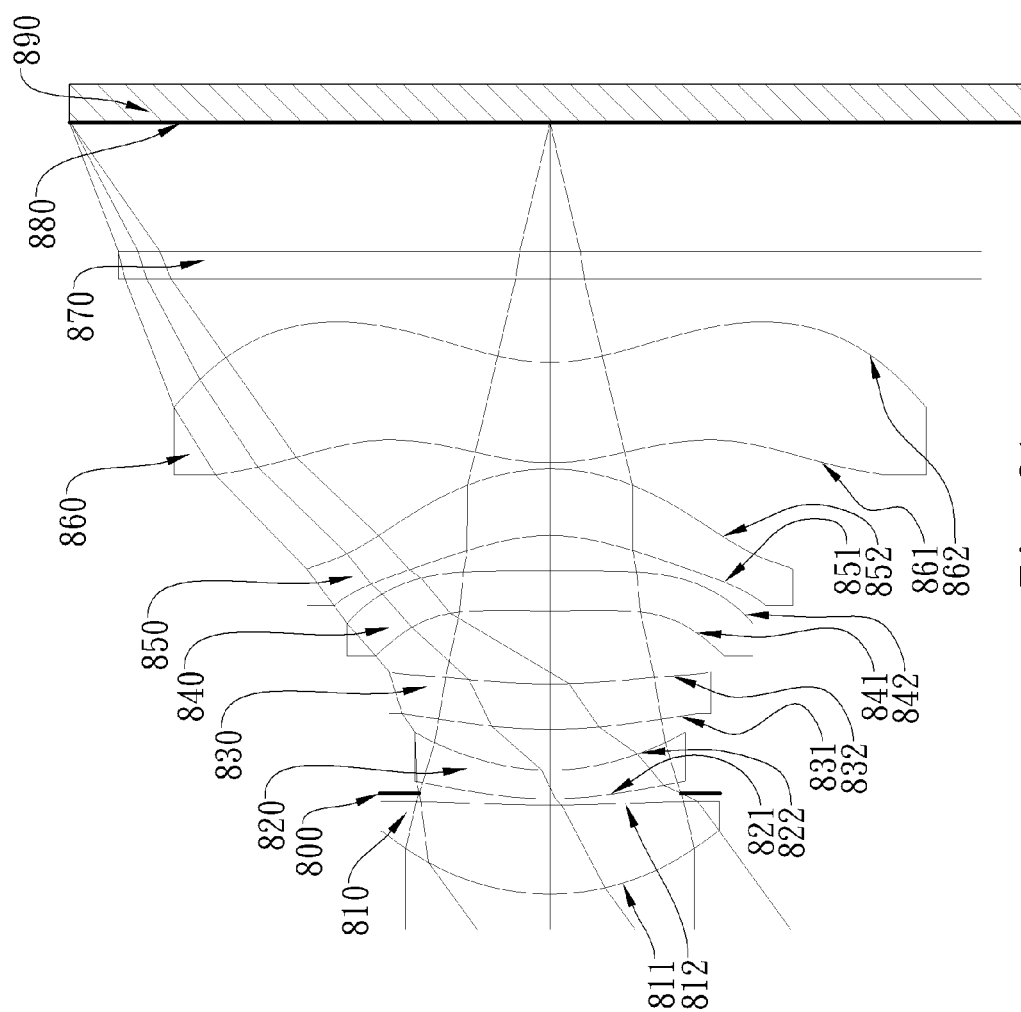
FIG. 8A is a schematic view of an image capturing device according to the 8th embodiment of the present disclosure.
Figure 8B:
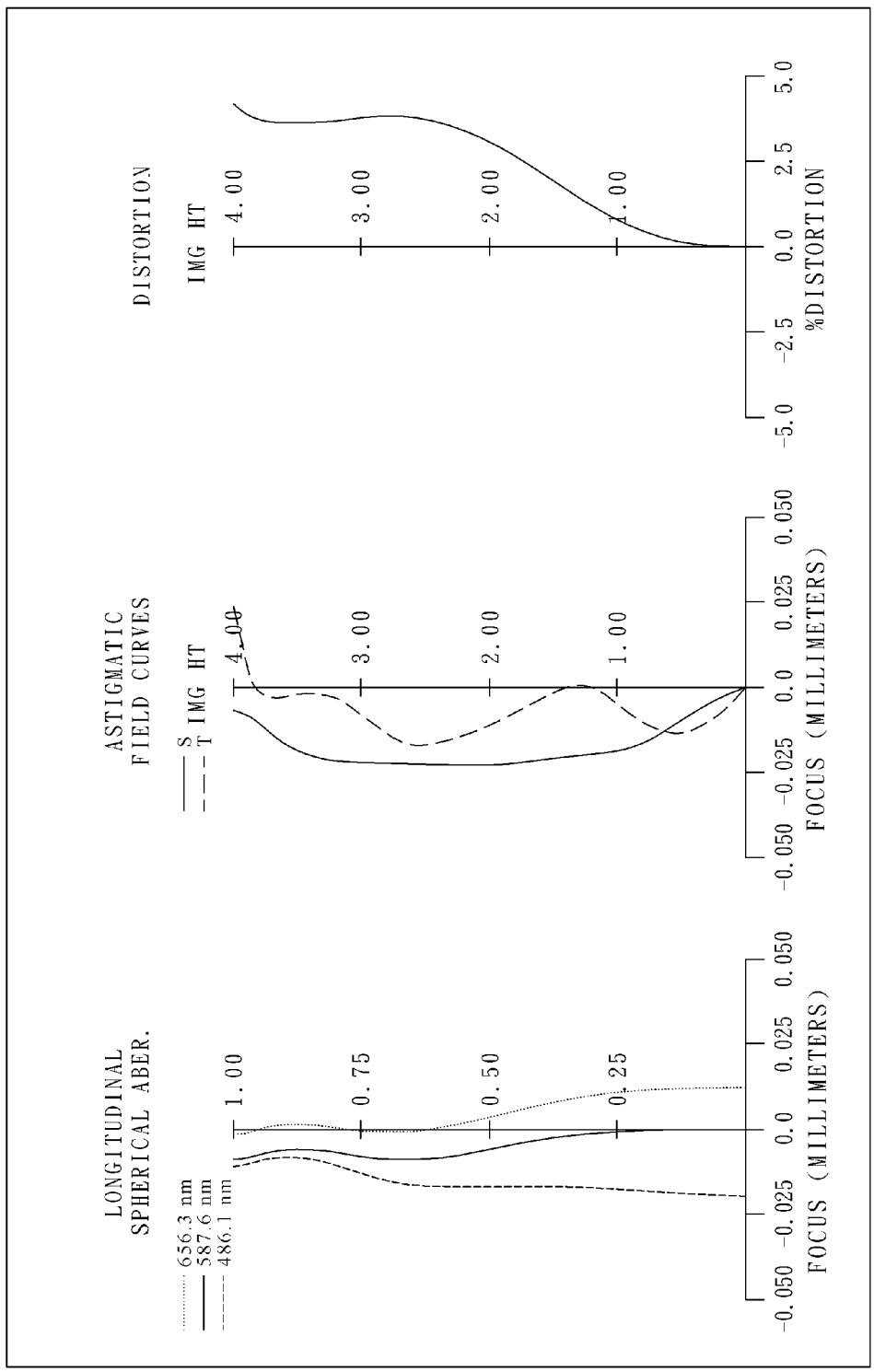
FIG. 8B shows spherical aberration curves, astigmatic field curves and a distortion curve of the image capturing device according to the 8th embodiment.

FIG. 8A is a schematic view of an image capturing device according to the 8th embodiment of the present disclosure. FIG. 8B shows, in order from left to right, spherical aberration curves, astigmatic field curves and a distortion curve of the image capturing device according to the 8th embodiment.

In FIG. 8A, the image capturing device includes the imaging optical system (not otherwise herein labeled) of the present disclosure and an image sensor 890. The imaging optical system includes, in order from an object side to an image side, a first lens element 810, an aperture stop 800, a second lens element 820, a third lens element 830, a fourth lens element 840, a fifth lens element 850, a sixth lens element 860, an IR-cut filter 870 and an image surface 880, wherein the imaging optical system has a total of six lens elements (810-860) with refractive power, which are non-cemented lens element.

The first lens element 810 with positive refractive power in a paraxial region thereof has an object-side surface being convex 811 in a paraxial region thereof and an image-side surface being concave 812 in a paraxial region thereof, which are both aspheric, the first lens element 810 is made of plastic material, and both of the object-side surface 811 and the image-side surface 812 of the first lens element 810 have at least one inflection point.

The second lens element 820 with negative refractive power in a paraxial region thereof has an object-side surface being convex 821 in a paraxial region thereof and an image-side surface being concave 822 in a paraxial region thereof, which are both aspheric, and the second lens element 820 is made of plastic material.

The third lens element 830 with positive refractive power in a paraxial region thereof has an object-side surface being convex 831 in a paraxial region thereof and an image-side surface being concave 832 in a paraxial region thereof, which are both aspheric, the third lens element 830 is made of plastic material, and both of the object-side surface 831 and the image-side surface 832 of the third lens element 830 have at least one inflection point.

The fourth lens element 840 with positive refractive power in a paraxial region thereof has an object-side surface being convex 841 in a paraxial region thereof and an image-side surface being concave 842 in a paraxial region thereof, which are both aspheric, the fourth lens element 840 is made of plastic material, and both of the object-side surface 841 and the image-side surface 842 of the fourth lens element 840 have at least one inflection point.

The fifth lens element 850 with negative refractive power in a paraxial region thereof has an object-side surface being concave 851 in a paraxial region thereof and an image-side surface being convex 852 in a paraxial region thereof, which are both aspheric, the fifth lens element 850 is made of plastic material, and the image-side surface 852 of the fifth lens element 850 has at least one inflection point.

The sixth lens element 860 with positive refractive power in a paraxial region thereof has an object-side surface being convex 861 in a paraxial region thereof and an image-side surface being concave 862 in a paraxial region thereof, which are both aspheric, the sixth lens element 860 is made of plastic material, and both of the object-side surface 861 and the image-side surface 862 of the sixth lens element 860 have at least one inflection point.

The IR-cut filter 870 is made of glass and located between the sixth lens element 860 and the image surface 880, and will not affect the focal length of the imaging optical system. The image sensor 890 is disposed on or near the image surface 880 of the imaging optical system.

The detailed optical data of the 8th embodiment are shown in Table 15 and the aspheric surface data are shown in Table 16 below.

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

TABLE 15

(Embodiment 8)
f = 5.29 mm, Fno = 2.20, HFOV = 36.0 deg.

| Surface # |  | Curvature Radius |  | Thickness | Material | Index | Abbe # | Focal Length |
|---|---|---|---|---|---|---|---|---|
| 0 | Object | Plano |  | Infinity |  |  |  |  |
| 1 | Lens 1 | 2.087 | ASP | 0.743 | Plastic | 1.535 | 55.7 | 4.61 |
| 2 |  | 11.903 | ASP | 0.097 |  |  |  |  |
| 3 | Ape. Stop | Plano |  | −0.047 |  |  |  |  |
| 4 | Lens 2 | 2.928 | ASP | 0.240 | Plastic | 1.650 | 21.4 | −8.31 |
| 5 |  | 1.837 | ASP | 0.342 |  |  |  |  |
| 6 | Lens 3 | 4.144 | ASP | 0.379 | Plastic | 1.544 | 55.9 | 33.26 |
| 7 |  | 5.202 | ASP | 0.611 |  |  |  |  |
| 8 | Lens 4 | 16.443 | ASP | 0.329 | Plastic | 1.544 | 55.9 | 35.87 |
| 9 |  | 103.606 | ASP | 0.300 |  |  |  |  |
| 10 | Lens 5 | −1.441 | ASP | 0.555 | Plastic | 1.544 | 55.9 | −52.21 |
| 11 |  | −1.724 | ASP | 0.050 |  |  |  |  |
| 12 | Lens 6 | 1.671 | ASP | 0.840 | Plastic | 1.535 | 55.7 | 21.01 |
| 13 |  | 1.619 | ASP | 0.700 |  |  |  |  |
| 14 | IR-cut filter | Plano |  | 0.230 | Glass | 1.517 | 64.2 | — |
| 15 |  | Plano |  | 1.073 |  |  |  |  |
| 16 | Image | Plano |  | — |  |  |  |  |

Note:
Reference wavelength is 587.6 nm (d-line).

TABLE 16

Aspheric Coefficients

| Surface # | | | | | |
|---|---|---|---|---|---|
| 1 | 2 | 4 | 5 | 6 | 7 |
| k = −5.2837E−02 | −9.4668E−01 | −1.5122E+00 | −3.6300E+00 | −2.6033E+01 | −9.0029E−01 |
| A4 = 2.8041E−03 | −2.3222E−02 | −6.8809E−02 | 5.6129E−03 | 1.5770E−02 | −3.3707E−02 |
| A6 = −6.6677E−04 | 1.6633E−02 | 3.1710E−02 | 4.3967E−03 | −2.0481E−02 | 3.5016E−03 |
| A8 = −2.4322E−04 | −1.3221E−02 | −8.0359E−03 | 6.4871E−03 | 9.4949E−03 | 5.7737E−04 |
| A10 = −2.0312E−04 | 5.2374E−03 | −3.8994E−03 | −3.2787E−03 | −5.8495E−03 | −4.3598E−03 |
| A12 = 4.8687E−05 | −5.7527E−04 | 7.2594E−03 | 2.0834E−03 | 2.5421E−03 | 2.7293E−03 |
| A14 = −1.1089E−04 | −1.4940E−04 | −2.2801E−03 | −2.5135E−05 |  |  |

| Surface # | | | | | |
|---|---|---|---|---|---|
| 8 | 9 | 10 | 11 | 12 | 13 |
| k = −5.2362E+00 | −1.0000E+00 | −9.0208E+00 | −7.1677E−01 | −7.1978E+00 | −4.7664E+00 |
| A4 = −7.7652E−02 | −2.3664E−02 | −1.6899E−02 | 1.4495E−02 | −6.1583E−02 | −3.7575E−02 |
| A6 = −1.2980E−02 | −2.7795E−02 | 2.6009E−03 | −6.2902E−03 | 1.5541E−02 | 6.9135E−03 |
| A8 = −9.1439E−03 | 6.2559E−03 | 5.3780E−03 | 3.2647E−03 | −5.0315E−03 | −1.2797E−03 |
| A10 = 1.0824E−03 | 1.0674E−03 | −2.0378E−03 | 4.2474E−04 | 1.3597E−03 | 1.6848E−04 |
| A12 = 1.9955E−03 | −3.3480E−04 | −3.9073E−05 | −9.1349E−05 | −2.0268E−04 | −1.4686E−05 |
| A14 = 7.8069E−04 | −2.8716E−05 | 3.1019E−05 | −3.4603E−05 | 1.5114E−05 | 7.4470E−07 |
| A16 = −3.9539E−04 |  | 4.1488E−06 | 4.7956E−06 | −4.4886E−07 | −1.6293E−08 |

| 8th Embodiment | | | |
|---|---|---|---|
| f [mm] | 5.29 | (R9 + R10)/(R9 − R10) | −11.18 |
| Fno | 2.20 | (f/f3) + (f/f4) | 0.31 |
| HFOV [deg.] | 36.0 | \|f/f3\| + \|f/f4\| + \|f/f5\| + \|f/f6\| | 0.66 |
| CT3/CT2 | 1.58 | Yc61/Yc62 | 0.75 |
| T45/CT5 | 0.54 | SD/TD | 0.81 |
| f/R8 | 0.05 | TL/ImgH | 1.61 |
| f/R10 | −3.07 | | |

9th Embodiment

Figure 9A:
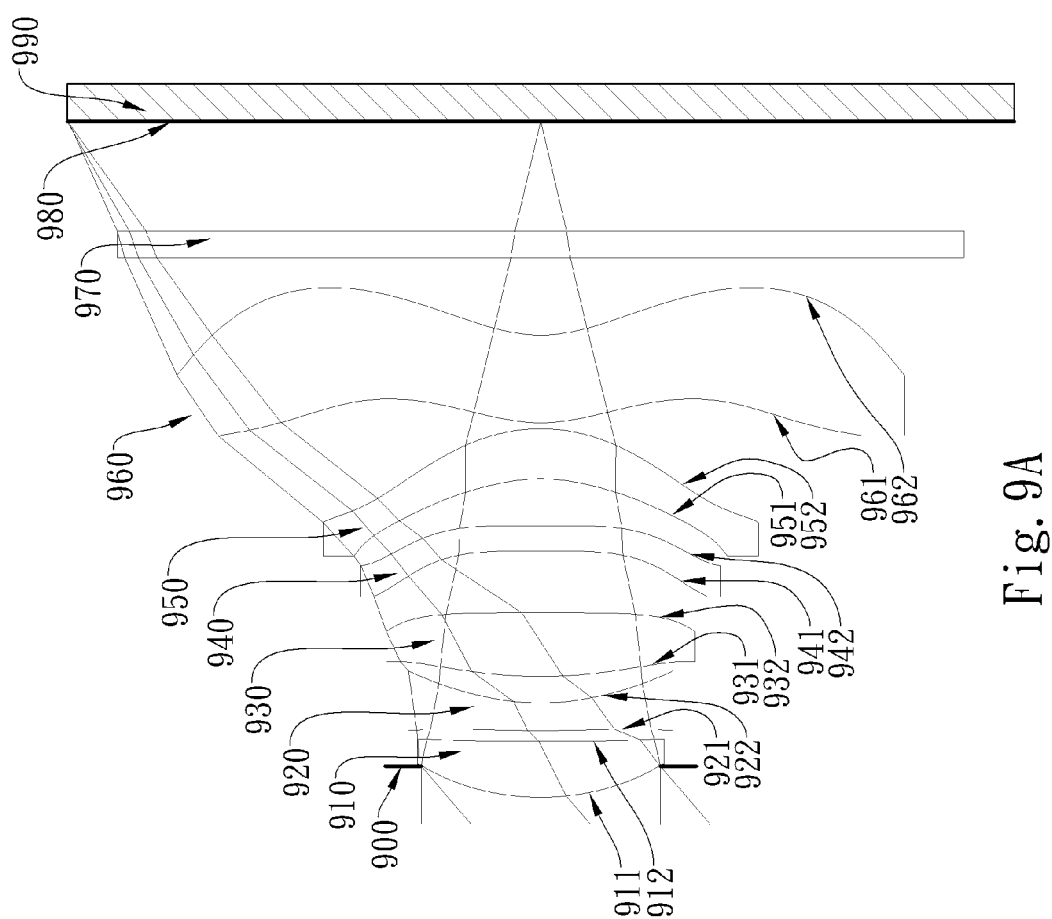
FIG. 9A is a schematic view of an image capturing device according to the 9th embodiment of the present disclosure.
Figure 9B:
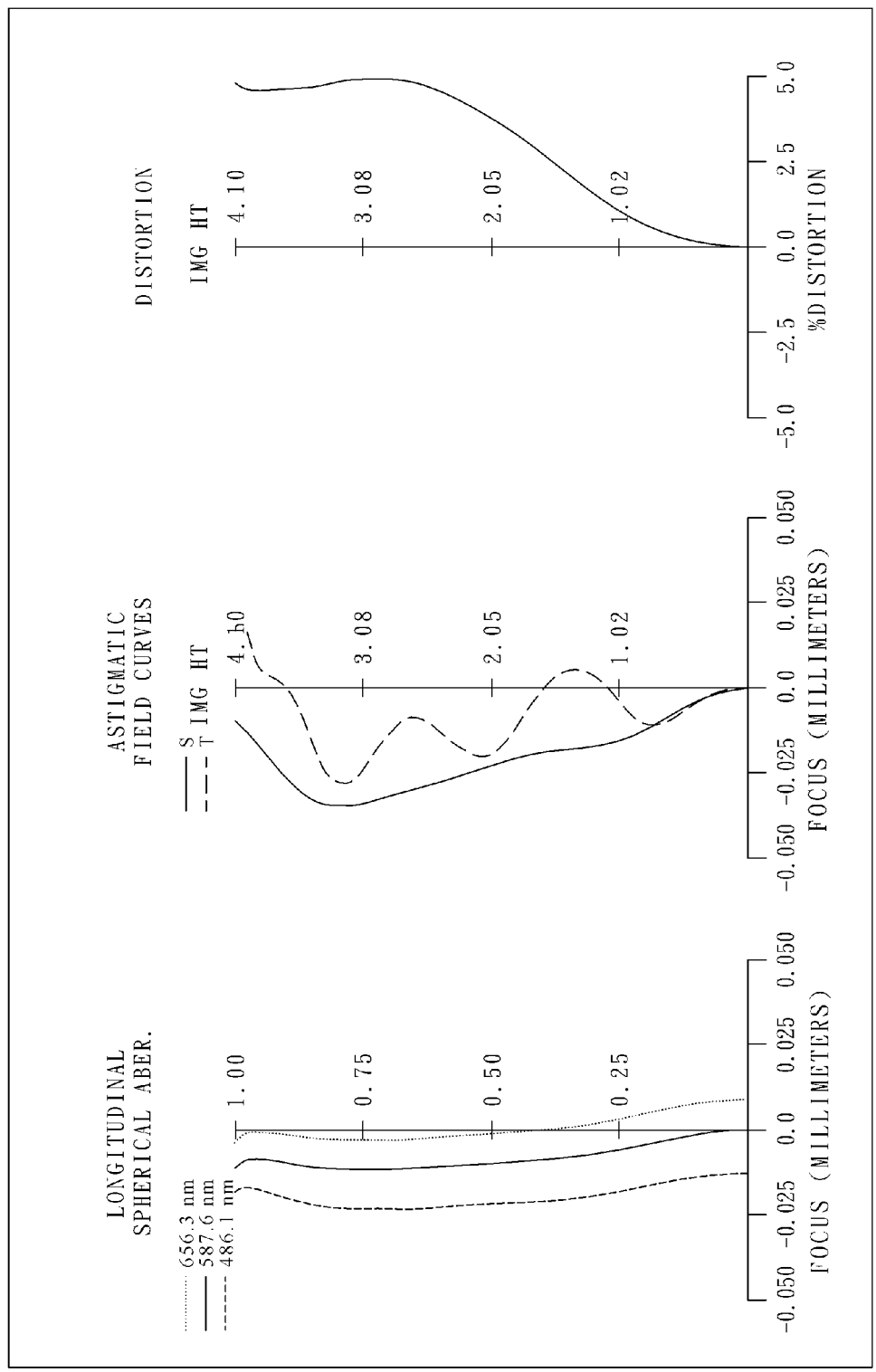
FIG. 9B shows spherical aberration curves, astigmatic field curves and a distortion curve of the image capturing device according to the 9th embodiment.

FIG. 9A is a schematic view of an image capturing device according to the 9th embodiment of the present disclosure. FIG. 9B shows, in order from left to right, spherical aberration curves, astigmatic field curves and a distortion curve of the image capturing device according to the 9th embodiment.

In FIG. 9A, the image capturing device includes the imaging optical system (not otherwise herein labeled) of the present disclosure and an image sensor 990. The imaging optical system includes, in order from an object side to an image side, an aperture stop 900, a first lens element 910, a second lens element 920, a third lens element 930, a fourth lens element 940, a fifth lens element 950, a sixth lens element 960, an IR-cut filter 970 and an image surface 980, wherein the imaging optical system has a total of six lens elements (910-960) with refractive power, which are non-cemented lens element.

The first lens element 910 with positive refractive power in a paraxial region thereof has an object-side surface being convex 911 in a paraxial region thereof and an image-side surface being convex 912 in a paraxial region thereof, which are both aspheric, the first lens element 910 is made of glass material, and both of the object-side surface 911 and the image-side surface 912 of the first lens element 910 have at least one inflection point.

The second lens element 920 with negative refractive power in a paraxial region thereof has an object-side surface being convex 921 in a paraxial region thereof and an image-side surface being concave 922 in a paraxial region thereof, which are both aspheric, and the second lens element 920 is made of plastic material.

The third lens element 930 with positive refractive power in a paraxial region thereof has an object-side surface being convex 931 in a paraxial region thereof and an image-side surface being convex 932 in a paraxial region thereof, which are both aspheric, the third lens element 930 is made of plastic material, and both of the object-side surface 931 and the image-side surface 932 of the third lens element 930 have at least one inflection point.

The fourth lens element 940 with negative refractive power in a paraxial region thereof has an object-side surface being concave 941 in a paraxial region thereof and an image-side surface being concave 942 in a paraxial region thereof, which are both aspheric, the fourth lens element 940 is made of plastic material, and both of the object-side surface 941 and the image-side surface 942 of the fourth lens element 940 have at least one inflection point.

The fifth lens element 950 with positive refractive power in a paraxial region thereof has an object-side surface being concave 951 in a paraxial region thereof and an image-side surface being convex 952 in a paraxial region thereof, which are both aspheric, the fifth lens element 950 is made of plastic material, and the image-side surface 952 of the fifth lens element 950 has at least one inflection point.

The sixth lens element 960 with positive refractive power in a paraxial region thereof has an object-side surface being convex 961 in a paraxial region thereof and an image-side surface being concave 962 in a paraxial region thereof, which are both aspheric, the sixth lens element 960 is made of plastic material, and both of the object-side surface 961 and the image-side surface 962 of the sixth lens element 960 have at least one inflection point.

The IR-cut filter 970 is made of glass and located between the sixth lens element 960 and the image surface 980, and will not affect the focal length of the imaging optical system. The image sensor 990 is disposed on or near the image surface 980 of the imaging optical system.

The detailed optical data of the 9th embodiment are shown in Table 17 and the aspheric surface data are shown in Table 18 below.

TABLE 17

(Embodiment 9)
f = 4.56 mm, Fno = 2.20, HFOV = 40.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.270 | | | | |
| 2 | Lens 1 | 2.183 | ASP | 0.487 | Glass | 1.603 | 38.0 | 3.50 |
| 3 | | −60.896 | ASP | 0.090 | | | | |
| 4 | Lens 2 | 12.010 | ASP | 0.240 | Plastic | 1.639 | 23.5 | −3.81 |
| 5 | | 2.009 | ASP | 0.230 | | | | |
| 6 | Lens 3 | 3.939 | ASP | 0.552 | Plastic | 1.530 | 55.8 | 7.33 |
| 7 | | −281.259 | ASP | 0.536 | | | | |
| 8 | Lens 4 | −298.010 | ASP | 0.217 | Plastic | 1.639 | 23.5 | −42.29 |
| 9 | | 29.726 | ASP | 0.409 | | | | |
| 10 | Lens 5 | −1.418 | ASP | 0.435 | Plastic | 1.535 | 55.7 | 36.73 |
| 11 | | −1.464 | ASP | 0.050 | | | | |
| 12 | Lens 6 | 1.371 | ASP | 0.761 | Plastic | 1.535 | 55.7 | 25.41 |
| 13 | | 1.229 | ASP | 0.672 | | | | |
| 14 | IR-cut filter | Plano | | 0.230 | Glass | 1.517 | 64.2 | — |
| 15 | | Plano | | 0.948 | | | | |
| 16 | Image | Plano | | — | | | | |

Note:
Reference wavelength is 587.6 nm (d-line).

TABLE 18

Aspheric Coefficients

| Surface # | | | | | |
|---|---|---|---|---|---|
| 2 | 3 | 4 | 5 | 6 | 7 |
| k = 2.0880E−01 | −3.0000E+01 | 3.0000E+00 | −7.7625E+00 | −1.4060E+01 | 3.0000E+00 |
| A4 = 5.4657E−03 | 4.7005E−02 | −4.2111E−02 | 1.9048E−02 | 1.2645E−02 | −1.9573E−02 |
| A6 = 4.3437E−03 | −3.2727E−02 | 3.0003E−02 | 6.2526E−03 | −1.4595E−02 | −5.3597E−03 |
| A8 = −4.4485E−03 | 1.0472E−02 | −1.8091E−02 | 2.5840E−03 | 5.0951E−03 | −4.7129E−03 |
| A10 = 4.1010E−03 | 1.2961E−02 | 3.6563E−03 | −4.0646E−04 | −5.6803E−03 | −2.6812E−03 |
| A12 = 4.0524E−03 | −5.2942E−03 | 5.0342E−03 | −4.8408E−03 | 1.3742E−03 | 9.6133E−04 |
| A14 = −3.1892E−03 | −6.4360E−03 | −8.8982E−03 | 2.6125E−03 | | |

| Surface # | | | | | |
|---|---|---|---|---|---|
| 8 | 9 | 10 | 11 | 12 | 13 |
| k = 3.0000E+00 | −1.0000E+00 | −1.2630E+01 | −8.0436E−01 | −7.6731E+00 | −4.3849E+00 |
| A4 = −1.4385E−01 | −1.2339E−01 | −7.2305E−02 | 5.9591E−03 | −6.3000E−02 | −4.2085E−02 |
| A6 = 1.0448E−02 | −3.1730E−03 | 5.4311E−03 | 4.9476E−03 | 1.5438E−02 | 8.4900E−03 |
| A8 = −4.1711E−03 | 1.0595E−02 | 1.2777E−02 | 3.4747E−03 | −4.9922E−03 | −1.5201E−03 |
| A10 = 2.1783E−03 | 1.0254E−03 | −2.1395E−03 | 2.1862E−04 | 1.3639E−03 | 1.8489E−04 |
| A12 = 2.3488E−03 | −2.8302E−04 | −7.6460E−04 | −1.6143E−04 | −2.0326E−04 | −1.4985E−05 |
| A14 = 1.1832E−03 | −1.8758E−05 | −1.5578E−04 | −4.3444E−05 | 1.5025E−05 | 6.9267E−07 |
| A16 = −7.3930E−04 | | 6.2416E−05 | 7.0902E−06 | −4.3907E−07 | −1.2696E−08 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

| 9th Embodiment | | | |
|---|---|---|---|
| f [mm] | 4.56 | (R9 + R10)/(R9 − R10) | −62.74 |
| Fno | 2.20 | (f/f3) + (f/f4) | 0.51 |
| HFOV [deg.] | 40.7 | \|f/f3\| + \|f/f4\| + \|f/f5\| + \|f/f6\| | 1.03 |
| CT3/CT2 | 2.30 | Yc61/Yc62 | 0.72 |
| T45/CT5 | 0.94 | SD/TD | 0.93 |
| f/R8 | 0.15 | TL/ImgH | 1.43 |
| f/R10 | −3.11 | | |

The foregoing description, for purpose of explanation, has been described with reference to specific embodiments. It is to be noted that TABLES 1-18 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging optical system comprising, in order from an object side to an image side:
   a first lens element having positive refractive power in a paraxial region thereof and an image-side surface being concave in a paraxial region thereof;
   a second lens element having negative refractive power in a paraxial region thereof;
   a third lens element;
   a fourth lens element with at least one of an object-side surface and an image-side surface thereof having at least one inflection point;
   a fifth lens element having an object-side surface being concave in a paraxial region thereof and an image-side surface being convex in a paraxial region thereof; wherein both of the object-side surface and the image-side surface of the fifth lens element are aspheric; and
   a sixth lens element with positive refractive power in a paraxial region thereof having an object-side surface being convex in a paraxial region thereof and an image-side surface being concave in a paraxial region thereof; wherein both of the object-side surface and the image-side surface of the sixth lens element are aspheric, and the image-side surface of the sixth lens element has at least one inflection point;
   wherein the imaging optical system has a total of six lens elements;
   wherein a focal length of the imaging optical system is f, a curvature radius of the image-side surface of the fourth lens element is R8, an axial distance between the fourth lens element and the fifth lens element is T45, a central thickness of the fifth lens element is CT5, and the following conditions are satisfied:

$-0.50 < f/R8$; and $0.30 < T45/CT5$.

2. The imaging optical system of claim 1, wherein the second lens element has an image-side surface being concave in a paraxial region thereof.

3. The imaging optical system of claim 2, wherein the third lens element has positive refractive power in a paraxial region thereof and has an image-side surface being convex in a paraxial region thereof.

4. The imaging optical system of claim 2, wherein the fifth lens element has negative refractive power in a paraxial region thereof.

5. The imaging optical system of claim 2, wherein a curvature radius of the object-side surface of the fifth lens element is R9, a curvature radius of the image-side surface of the fifth lens element is R10, and the following condition is satisfied:

(R9+R10)/(R9−R10)<2.0.

6. The imaging optical system of claim 1, wherein the imaging optical system further comprises an aperture stop, an axial distance between the aperture stop and the image-side surface of the sixth lens element is SD, an axial distance between the object-side surface of the first lens element and the image-side surface of the sixth lens element is TD, and the following condition is satisfied:

0.75<SD/TD<1.1.

7. The imaging optical system of claim 6, wherein the second lens element has an object-side surface being convex in a paraxial region thereof, an f-number of the imaging optical system is Fno, and the following condition is satisfied:

1.50<Fno<2.50.

8. The imaging optical system of claim 1, wherein the focal length of the imaging optical system is f, the curvature radius of the image-side surface of the fourth lens element is R8, the following condition is satisfied:

0.0<f/R8.

9. The imaging optical system of claim 1, wherein a central thickness of the third lens element is CT3, a central thickness of the second lens element is CT2, the following condition is satisfied:

1.40<CT3/CT2.

10. The imaging optical system of claim 1, wherein a curvature radius of the object-side surface of the fifth lens element is R9, a curvature radius of the image-side surface of the fifth lens element is R10, and the following condition is satisfied:

(R9+R10)/(R9−R10)<−3.0.

11. The imaging optical system of claim 1, wherein the focal length of the imaging optical system is f, a focal length of the third lens element is f3, a focal length of the fourth lens element is f4, and the following condition is satisfied:

0.1<(f/f3)+(f/f4).

12. The imaging optical system of claim 1, wherein the object-side surfaces and the image-side surfaces of the first lens element, the second lens element, the third lens element, and the fourth lens element are aspheric, an axial distance between the object-side surface of the first lens element and an image surface is TL, a maximal image height of the imaging optical system is ImgH, and the following condition is satisfied:

TL/ImgH<1.80.

13. The imaging optical system of claim 1, wherein a half of a maximal field of view of the imaging optical system is HFOV, and the following condition is satisfied:

38.0 degrees<HFOV.

14. An image capturing device, comprising:
the imaging optical system of claim 1; and
an image sensor;
wherein the image sensor is positioned on or near an image surface of the imaging optical system.

15. An electronic device, comprising:
the image capturing device of claim 14.

16. An imaging optical system comprising, in order from an object side to an image side:
a first lens element having positive refractive power in a paraxial region thereof and an image-side surface being concave in a paraxial region thereof;
a second lens element having an image-side surface being concave in a paraxial region thereof;
a third lens element having both of an object-side surface and an image-side surface thereof being aspheric;
a fourth lens element having both of an object-side surface and an image-side surface thereof being aspheric;
a fifth lens element having an object-side surface being concave in a paraxial region thereof and an image-side surface being convex in a paraxial region thereof; wherein both of the object-side surface and the image-side surface of the fifth lens element are aspheric; and
a sixth lens element with positive refractive power in a paraxial region thereof having an object-side surface being convex in a paraxial region thereof and an image-side surface being concave in a paraxial region thereof; wherein both of the object-side surface and the image-side surface of the sixth lens element are aspheric, and the image-side surface of the sixth lens element has at least one inflection point;
wherein the imaging optical system has a total of six lens elements;
wherein a focal length of the imaging optical system is f, a curvature radius of the image-side surface of the fourth lens element is R8, half of a maximal field of view of the imaging optical system is HFOV, and the following conditions are satisfied:

−0.20<f/R8; and 38.0 degrees <HFOV.

17. The imaging optical system of claim 16, wherein the second lens element has negative refractive power in a paraxial region thereof.

18. The imaging optical system of claim 16, wherein the fourth lens element has negative refractive power in a paraxial region thereof.

19. The imaging optical system of claim 16, wherein the fourth lens element has a convex object-side surface in a paraxial region thereof.

20. The imaging optical system of claim 16, wherein the first lens element, the second lens element, the third lens element, the fourth lens element, the fifth lens element, and the sixth lens element are non-cemented lens elements, and the imaging optical system further comprises an aperture stop positioned between an imaged object and the second lens element.

21. The imaging optical system of claim 20, wherein the focal length of the imaging optical system is f, a focal length of the third lens element is f3, a focal length of the fourth lens element is f4, a focal length of the fifth lens element is f5, a focal length of the sixth lens element is f6, and the following condition is satisfied:

0.6<|f/f3|+|f/f4|+|f/f5|+|f/f6|<1.7.

22. The imaging optical system of claim 20, wherein among the object-side surfaces and the image-side surfaces of the first lens element, the second lens element, the third lens element, the fourth lens element, the fifth lens element, and the sixth lens element, at least five surfaces has at least one inflection point on each surface.

23. The imaging optical system of claim 20, wherein a focal length of the imaging optical system is f, a curvature radius of the image-side surface of the fifth lens element is R10, and the following condition is satisfied:

$f/R10 < -1.5$.

24. The imaging optical system of claim 16, wherein the focal length of the imaging optical system is f, the curvature radius of the image-side surface of the fourth lens element is R8, and the following condition is satisfied:

$0.0 \leq f/R8$.

25. The imaging optical system of claim 16, wherein a vertical distance between a non-axial critical point on the object-side surface of the sixth lens element and an optical axis is Yc61, a vertical distance between a non-axial critical point on the image-side surface of the sixth lens element and an optical axis is Yc62, and the following condition is satisfied:

$0.2 < Yc61/Yc62 < 0.9$.

* * * * *